US009985978B2

(12) United States Patent
Smith et al.

(10) Patent No.: US 9,985,978 B2
(45) Date of Patent: May 29, 2018

(54) METHOD AND SYSTEM FOR MISUSE DETECTION

(71) Applicant: Cyveillance, Inc., Reston, VA (US)

(72) Inventors: Steve Smith, Vienna, VA (US); Vlad Serban, McLean, VA (US); Andy Walker, Alexandria, VA (US); Greg Ogorek, Ashburn, VA (US)

(73) Assignee: LOOKINGGLASS CYBER SOLUTIONS, Reston, VA (US)

( * ) Notice: Subject to any disclaimer, the term of this patent is extended or adjusted under 35 U.S.C. 154(b) by 0 days. days.

(21) Appl. No.: 14/868,057

(22) Filed: Sep. 28, 2015

(65) Prior Publication Data

US 2016/0191548 A1 Jun. 30, 2016

Related U.S. Application Data

(63) Continuation-in-part of application No. 12/436,380, filed on May 6, 2009, now Pat. No. 9,148,445, which
(Continued)

(51) Int. Cl.
*H04L 29/06* (2006.01)
*G06F 21/55* (2013.01)
(Continued)

(52) U.S. Cl.
CPC ........ *H04L 63/1416* (2013.01); *G06F 21/554* (2013.01); *G06F 21/565* (2013.01);
(Continued)

(58) Field of Classification Search
CPC ............ H04L 63/1416; H04L 63/1483; H04L 63/168; H04L 67/02; H04L 63/0227;
(Continued)

(56) References Cited

U.S. PATENT DOCUMENTS

2007/0079379 A1\* 4/2007 Sprosts ................ G06Q 10/107
726/24
2008/0034211 A1 2/2008 Shull et al.
(Continued)

OTHER PUBLICATIONS

David Dagon et al., "Corrupted DNS Resolution Paths: The Rise of a Malicious Resolution Authority", Proc, 15th Network and Distributed System Security Symposium (NDSS), 2008.

*Primary Examiner* — Brandon Hoffman
*Assistant Examiner* — Nega Woldemariam
(74) *Attorney, Agent, or Firm* — Kenealy Vaidya LLP

(57) ABSTRACT

This disclosure discusses methods, systems, and an apparatus that can determine whether email content is potentially malicious, contains potentially malicious content, has originated from a potentially malicious entity, or contains links or other references to potentially malicious web content. The disclosure discusses some embodiments that include evaluating text in the email content to determine if predetermined suspected malicious phrases are present in the text, evaluating one or more links in the email content using an IP address, URL, or DNS to determine if the links reference potentially malicious web content, and evaluating metadata in the email content to determine if the email content is potentially malicious.

21 Claims, 26 Drawing Sheets

Related U.S. Application Data is a continuation-in-part of application No. 14/811,634, filed on Jul. 28, 2015, which is a continuation-in-part of application No. 12/907,721, filed on Oct. 19, 2010, now Pat. No. 9,123,027.

(60) Provisional application No. 61/051,237, filed on May 7, 2008.

(51) Int. Cl.
*G06F 21/56* (2013.01)
*H04L 29/08* (2006.01)

(52) U.S. Cl.
CPC ...... *H04L 63/0227* (2013.01); *H04L 63/1483* (2013.01); *H04L 63/168* (2013.01); *H04L 67/02* (2013.01); *G06F 2221/2119* (2013.01); *H04L 63/101* (2013.01)

(58) Field of Classification Search
CPC ... H04L 63/101; G06F 21/554; G06F 21/565; G06F 2221/2119
See application file for complete search history.

(56) References Cited

U.S. PATENT DOCUMENTS

| | | |
|---|---|---|
| 2008/0201464 A1 | 8/2008 | Campbell et al. |
| 2009/0327849 A1* | 12/2009 | Kavanagh ............ G06Q 10/107 715/205 |

* cited by examiner

- ◉ Test single page ～1810
- ○ Run test pages (6 test pages available) ～1820
- [ Next > ] ～1830

Results 2010

| Property | Value |
|---|---|
| URL | Http://www.test1.com/ |
| ipaddress | 192.168.1.1 |
| sourcestage | DOWNLOAD_WEB_REQUESTS |
| isValidIP | 1 |
| isPharming | 0 |
| Result | 2 |
| ... | |
| ... | |
| ... | |

Content 2020

This is a test of our pharming scoring.

< Back — 2030
Save As Test Case — 2040
Done — 2050

FIG. 21

Test Results 2110

| Result | Test URL | |
|---|---|---|
| Passed | Http://www.test1.com/ | Edit... |
| Failed | Http://www.test2.com/ | Edit... |
| Failed | Http://www.test3.com/ | Edit... |
| Passed | Http://www.test4.com/ | Edit... |
| Passed | Http://www.test5.com/ | Edit... |

Details 2120

| Property | Expected Value | Actual Value |
|---|---|---|
| URL | Http://www.test2.com/ | Http://www.test2.com/ |
| ipaddress | 192.168.1.1 | 192.168.1.1 |
| isValidIP | 1 | 1 |
| isPharming | 0 | 1 |

# METHOD AND SYSTEM FOR MISUSE DETECTION

CROSS-REFERENCE TO RELATED APPLICATION

This application is a continuation-in-part of application Ser. No. 12/436,380 filed on Jun. 6, 2009, which claims the benefit of U.S. Provisional Application No. 61/051,237 filed May 7, 2008. This application is a continuation-in-part of application Ser. No. 14/811,634 filed Jul. 28, 2015, which is a continuation-in-part of application Ser. No. 12/907,721 filed Oct. 19, 2010. The content of each of these applications is hereby incorporated by reference in their entirety.

BACKGROUND

Some of the disclosed embodiments are generally directed to methods and systems for detecting and responding to social engineering attacks. In particular, social engineering attacks can take many forms such as malicious emails, websites, downloadable content, or other malicious digital media. One factor contributing to this problem is that email and other forms of Internet communications are becoming more ubiquitous as more and more people depend on them for everyday personal and business purposes. Further, the technologies used to implement these forms of communications are also advancing at an incredible speed in terms of their complexity and flexibility. As a result, a situation has emerged in which the user-base is expanding, often with an ever increasing number of non-technically savvy new users. Simultaneously, these users are expanding in size at the same time that the software used by such users is becoming more sophisticated. The increasing gap between a users' technical familiarity with the tools they employ and the intricacies of those same tools presents hackers and other bad actors with the opportunity to exploit a large and unsuspecting user-base.

One common technique that hackers have used to exploit this gap is a social engineering attack. In a social engineering attack, a hacker often seeks to extract information from a user by deceiving the user into believing that he or she is providing information to or taking some action with respect to a trusted party. The social engineering attack thus differs from other hacking attacks in which a hacker may attempt to gain access to a computer or network purely through technological means or without the victim's assistance.

A "phishing" attempt is one example of a social engineering attack. In a phishing attempt, a hacker may send an email that poses as another party, such as a bank or other entity with which the user has an account. The phishing email may use company logos or information about the user to appear legitimate. Images, links, and diction in the email may each or all be of a fraudulent nature. The user might be invited to "log in" or to provide other information to a nefarious website that mimics a legitimate website, for example, by telling the user that he or she usually reset his or her password. When the user logs into the fraudulent website, usually operated by the hacker, the hacker obtains the user's password or other information, which the hacker may then use to log into the user's actual account.

Another example of a social engineering attack is when a user is sent an email inviting the user to click on a link to download content that harbors malware. The term malware generally refers to any kind of program that is designed to perform operations that the owner or user of the computer on which the program resides would not approve of, and may include viruses, worms, Trojan horses, spyware, adware, etc. For example, a user may be sent an email that purports to be from a person or an institution that the user knows. The email invites the user to download a song or movie by providing a link. However, the link may instead point to malware that, once downloaded and executed by the user, installs a Trojan horse, virus, or any other form of malware on the user's computer.

Some related art approaches to protecting users from social engineering attacks have tended to focus on analyzing the email itself for standard patterns and clues as to whether the email may constitute a form of a social engineering attack. However, this approach is of limited value when the email either does not contain one or more of the standard patterns, or may be recognized as malicious only by referencing external information associated with the email that could be constantly changing or evolving. There is therefore a need for methods and systems that are able to evaluate emails, websites, or any other form of analog or digital media using information external to the content of the digital media itself.

SUMMARY

In light of the foregoing problems, it may be beneficial to have a system, apparatus or method for determining whether email content including images, links, attached files, text (including patterns in speech, keywords, etc.), metadata, originating sender, email subject, etc. is potentially malicious, contains potentially malicious content, has originated from a potentially malicious entity, or contains links or other references to potentially malicious web content. For example, a method for identifying a potentially malicious email could include evaluating text in the email content to determine if predetermined suspected malicious phrases are present in the text. Such a method could also include evaluating one or more links in the email content using any of an IP address, URL, or DNS to determine if one (or more) of the links reference potentially malicious web content. Such a system, apparatus or method could also consist of evaluating metadata in the email content to determine if the email content is potentially malicious, and then take actions according to the determination of the email's legitimacy.

It could also be advantageous to have a system, apparatus, and methods for identifying malicious content in a digital document, such as a webpage, that could aid in the analysis of potentially malicious emails. A few embodiments provided below address some of the aforementioned problems. Some prior art has been directed towards techniques for inserting a portion of code into a digital document to hamper a malicious entity's attempts to copy and/or reproduce the document. In some embodiments of the current disclosure, new systems, methods and apparatuses are provided that are capable of providing a numerical "score" for a digital document such as a web page, email, downloadable file, or any other form of digital media. In some embodiments, a system, apparatus and methods are described that are capable of determining a likelihood of whether a digital document contains potentially malicious content. In order to accomplish this task, in various embodiments, a scoring module is employed and configured to provide a page score for the digital document representing the likelihood that the document contains potentially malicious content using a Word Expression. The Word Expression is an equation having at least one variable that represents a number of occurrences of potentially malicious content in the digital document. The scoring module is capable of providing both a real-time and a post-production evaluation of the digital document, and can contribute an output value that represents the likelihood of potentially malicious content being present in the digital document. The scoring module can also be configured to utilize inheritance, such that the digital document score is based on each of formulas within its own report and also one or more of one or more parent reports.

This analysis may comprise executing one or more of four distinct operations, including comparing information extracted from or associated with a digital media document (such as an email) against a data store of previously collected information; performing behavioral analysis on the digital media document; analyzing the digital media document's semantic information for patterns suggestive of a social engineering attack; and forwarding the digital media document to an analyst for manual review. One or more of these operations may also be performed in real-time or near real-time.

The scoring process, which is a statistical evaluation of digital content, can be used to make the evaluation as to whether digital media content is malicious across numerous other platforms as well, including but not limited to media such as files saved on USB drives, CD/DVD's, social media content, etc.

BRIEF DESCRIPTION OF THE DRAWINGS

FIG. 18 is a screen shot illustrating a hypothetical user interface (UI) allowing a user to select whether a scoring testing routine is performed on a single test page or multiple test pages consistent with certain disclosed embodiments;

FIG. 19 is a screen shot illustrating a hypothetical user interface (UI) that could be used by a user if the user chooses to test a single page consistent with certain disclosed embodiments;

FIG. 20 is a screen shot illustrating a hypothetical user interface (UI) that could be spawned in the event that the scoring option depicted in FIG. 19 has been selected consistent with certain disclosed embodiments;

FIG. 21 is a screen shot illustrating a hypothetical user interface (UI) that could be used by a user if the user chooses to test multiple pages consistent with certain disclosed embodiments;

DESCRIPTION OF EMBODIMENTS

A common use of stolen or copied code is to facilitate various forms of online fraud. As previously stated, this can include but is not limited to phishing or "spear" phishing attacks in which copies or facsimiles of a legitimate Web page are created and used to fool users' (and/or viewers, etc.). These attacks are often motivated by the allure of stealing a users' financial or personal information. However, phishing can be defined as any attempt to acquire information (e.g., usernames, passwords, credit card details, social security numbers, etc.), by masquerading as a trustworthy or otherwise legitimate entity in an electronic communication such as in an email, on a website, during an electronic transaction, etc.

One typical form of phishing attacks occurs in the form of malicious emails sent to users containing links or references to illegitimate web pages, illegitimate web content, or even the email addresses of illegitimate entities. These malicious emails can also contain other forms of code or software, downloadable files, or even language such as "Nigerian Prince seeks individual to receive $1M". These could all be intended to trick the recipient into performing various tasks that may be undesirable, such as volunteering information, downloading attached files, or visiting malicious websites. They may also be used in any other number of ways, such as enticing the email recipient to fill out forms, call phone numbers owned by the malicious parties or their affiliates, etc.

To combat such online fraud, a method, apparatus, and system is provided for fraud detection. Such methods, apparatus, and systems can use technology to monitor and detect the legitimacy of emails or email content, links, images, videos, etc. based on any one or more of an instantaneously identified, previously identified, or in some cases even human or otherwise $3^{rd}$ party identified misuse of legitimate Web code and content.

The aforementioned malicious web content could be identified by a scoring engine whose architecture can be outlined by the description given in the last portion of the disclosure, and according to the following table:

Scoring Engine Embodiments

Figure 1:
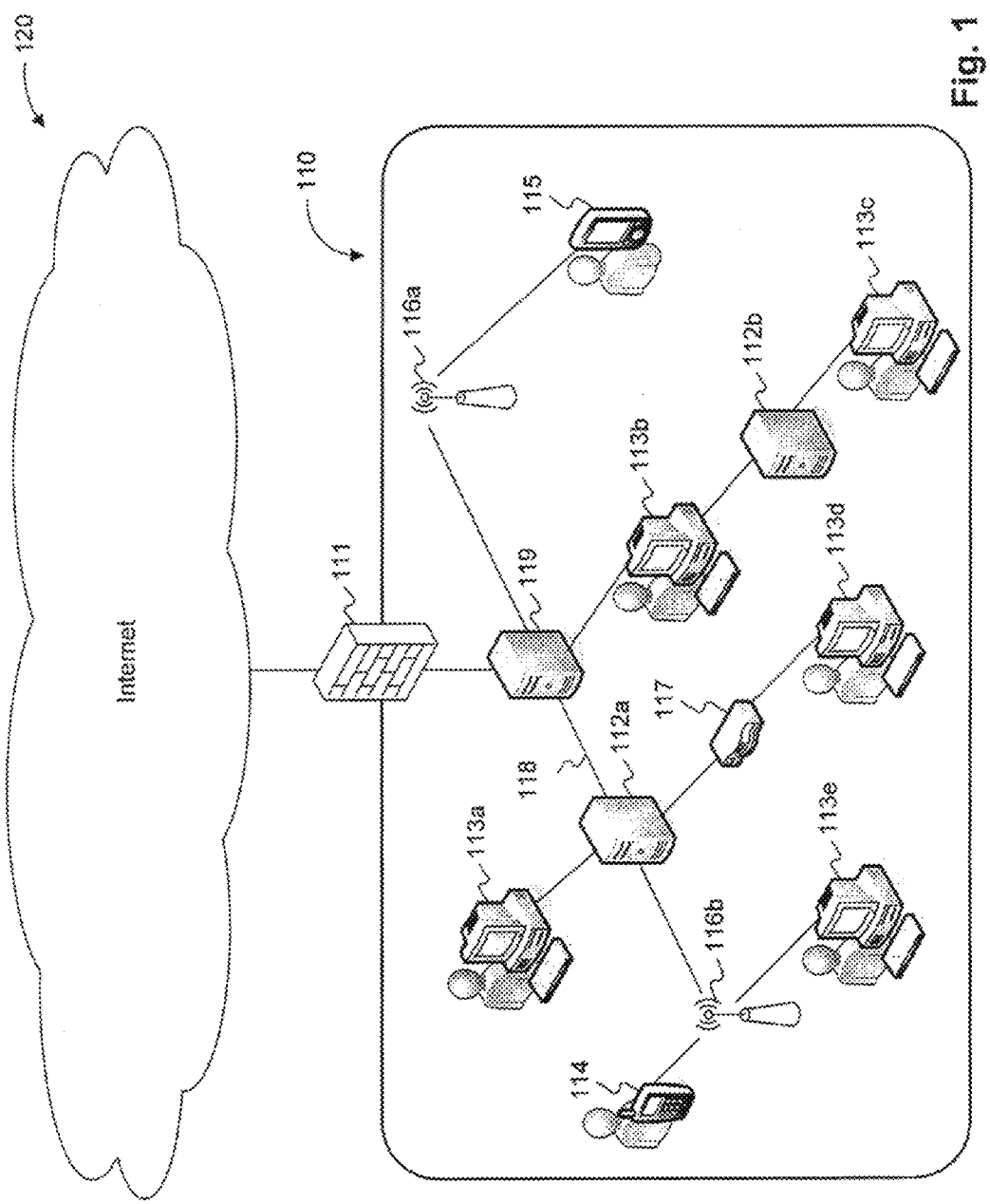
FIG. 1 is a schematic of an exemplary internal network interfacing with the Internet, consistent with certain disclosed embodiments.

CONTENTS
1. NETWORK ARCHITECTURE
2. INFORMATION COLLECTION AND ANALYSIS
3. TECHNICAL DETAILS OF THE SCORING PROCESS
   3.1. OVERVIEW
   3.2. TERMINOLOGY
   3.3. PROTOTYPE
   3.4. SPECIFICATIONS
   3.4.1. ARCHITECTURE
   3.4.2. INPUT
   3.4.3. OUTPUT
4. SCORING
   4.1. WORD EXPRESSIONS
   4.2. SCRIPTS
   4.2.1. REAL TIME SCORING
   4.2.2. POST-PRODUCTION SCORING
5. DESIGN
   5.1. SYSTEMS ARCHITECTURE
   5.2. SCORING ENGINE
   5.2.1. APPLICATION DATA FLOW
      5.2.1.1. ContextSplitProcessor
      5.2.1.2. ExclusionProcessor
      5.2.1.3. ScriptProcessor
   5.2.2. CLASS MODEL
      5.2.2.1. ScriptEngine
      5.2.2.2. ExclusionProcessor
      5.2.2.3. ContextSplitProcessor
      5.2.2.4. ConfigurationManager
   5.2.3. REAL-TIME CONFIGURATION UPDATES
   5.2.4. ERROR HANDLING
6. APPLICATION MONITORING
   6.1. USER INTERFACE FIG. 1 is a schematic of an exemplary internal network sought to be protected from cyberattacks, including social engineering attempts, consistent with certain disclosed embodiments. As shown in FIG. 1, network 110 may include one or more computers, e.g., user workstations 113a-113e; one or more internal servers, e.g., servers 112a-112b; one or more mobile devices, e.g., mobile phone 114 and/or personal digital assistant (PDA) 115. Each device in network 110 may be operatively connected with one or more other devices, such as by wired network cable, e.g., cat5 Ethernet cable 118; wireless transmission station, e.g., stations 116a-116b; network router, e.g., router 117, etc. It will be appreciated by those skilled in the art that many other types of electronic digital and/or analog devices may be included in network 110, or may be connected in different manners. It will also be appreciated by those skilled in the art that the devices resident in network 110 need not be physically collocated but may also be geographically spread across buildings, jurisdictional boundaries, states, or even foreign countries. Moreover, a given device may reside within multiple networks, or may become part of a network only when certain programs or processes, such as a virtual private network, are operating. Communications between devices within network 110 and devices outside of the network, such as devices connected to the Internet 120, may first pass through or be subject to one or more security devices or applications, such as a proxy server 119 or firewall 111.

2. Information Collection and Analysis

Figure 2:
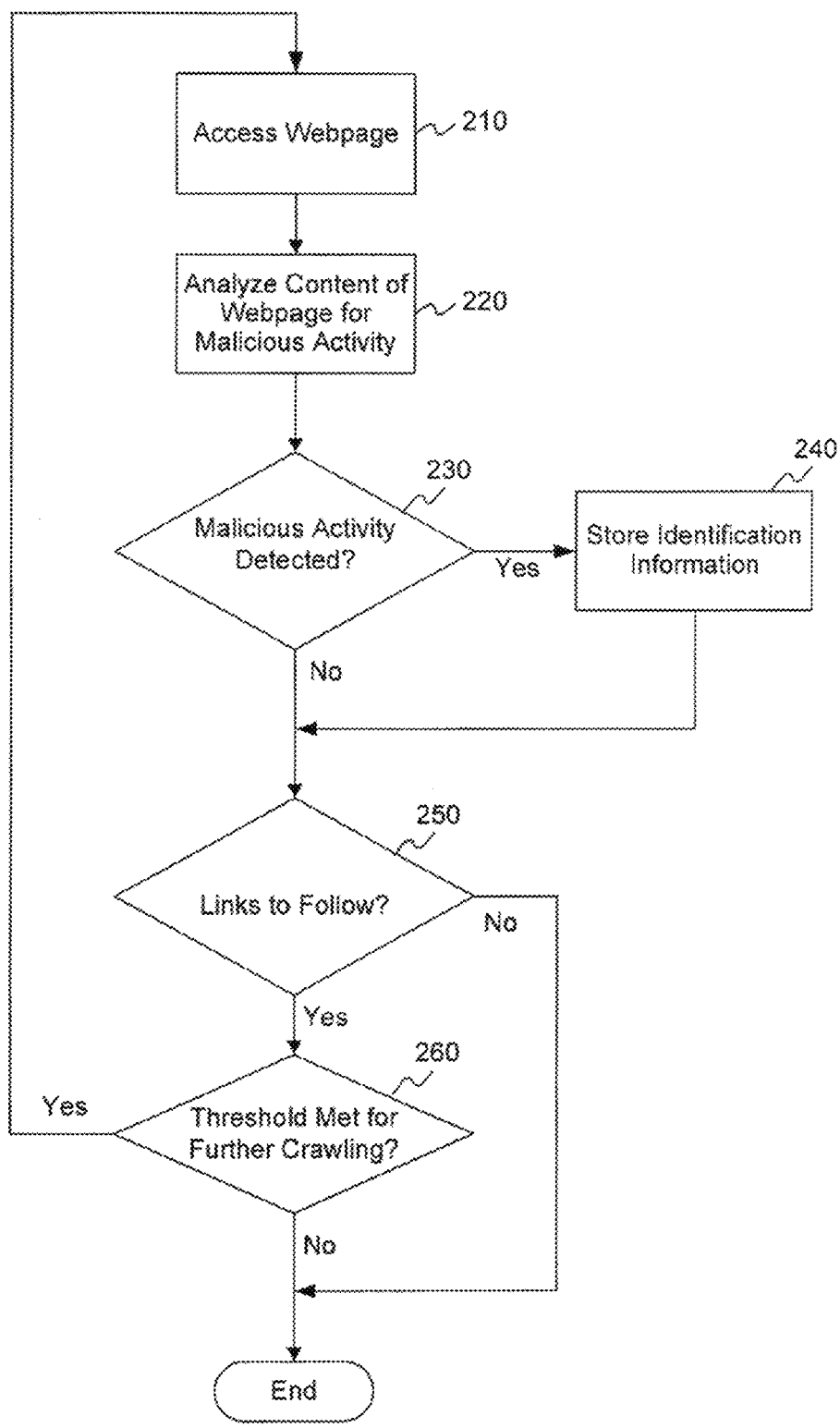
FIG. 2 is an exemplary flow schematic illustrating a method of collecting network information related to potential cyber threats, consistent with certain disclosed embodiments.
Figure 3:
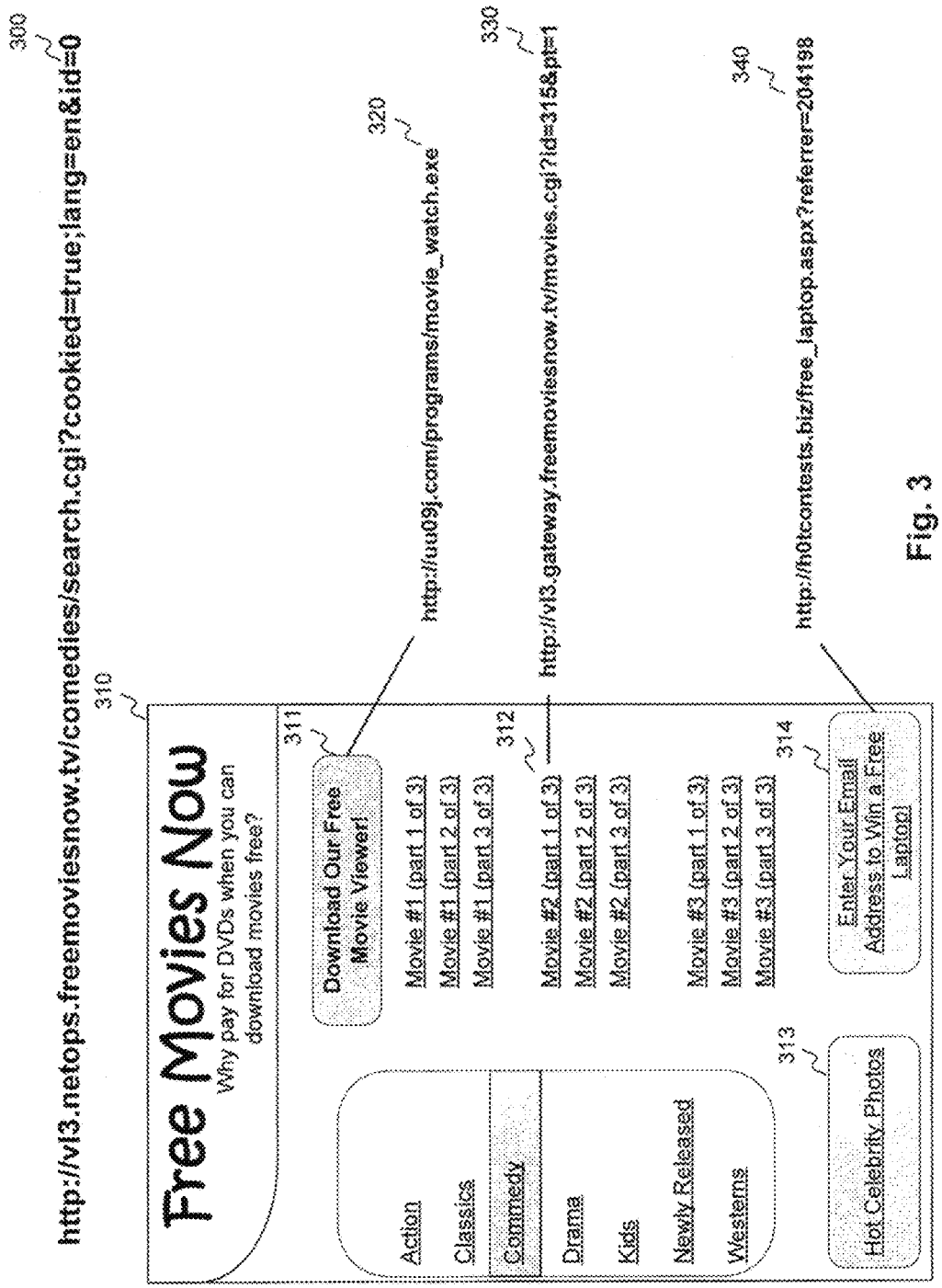
FIG. 3 is a schematic depicting an exemplary webpage, the content of which is analyzed by the collection process of FIG. 2, consistent with certain disclosed embodiments.
Figure 4A:
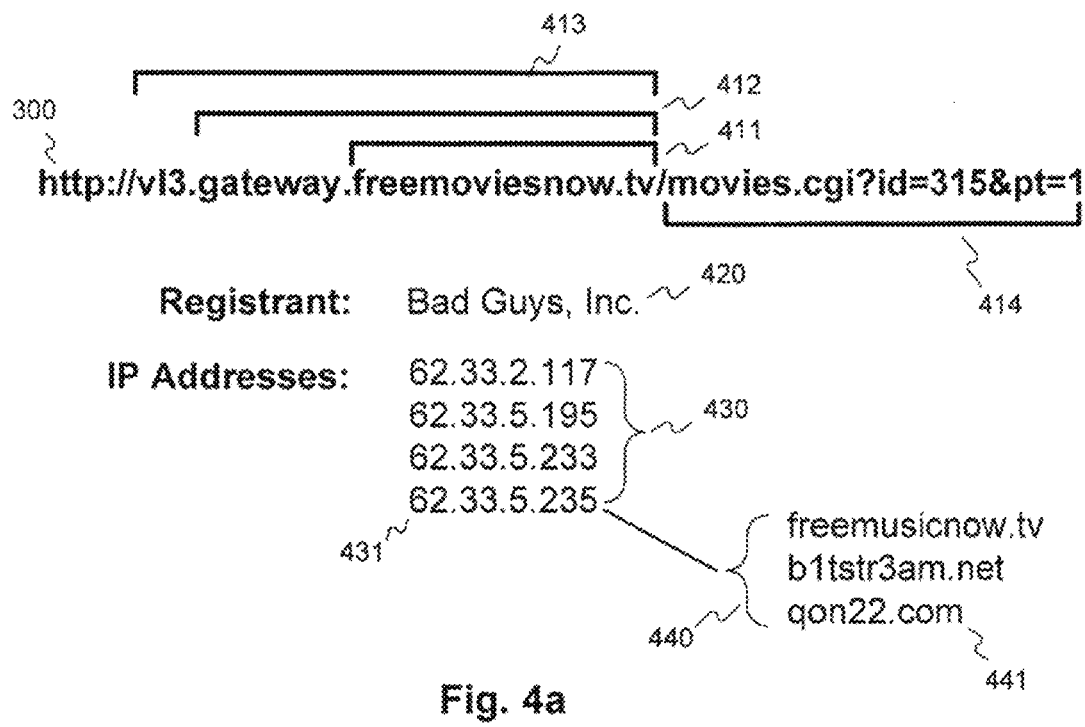
FIG. 4a is a schematic depicting sample information further collected based on the webpage of FIG. 3 by the process of FIG. 2, consistent with certain disclosed embodiments.
Figure 4B:
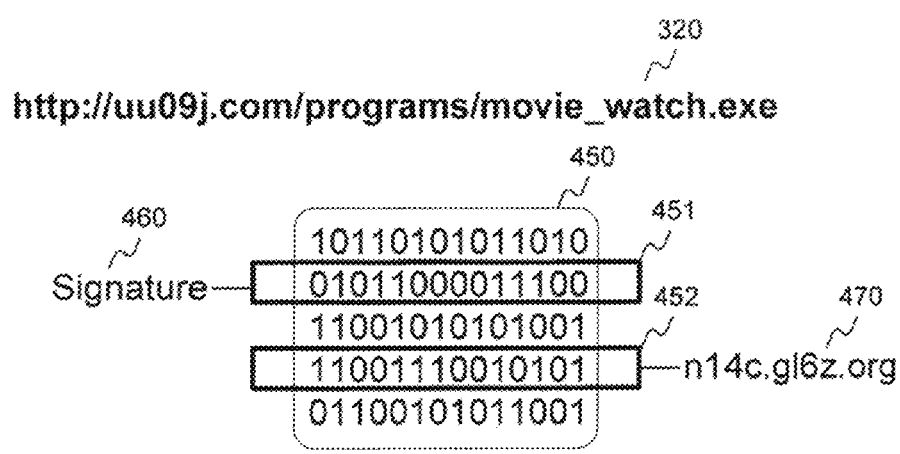
FIG. 4b is a schematic depicting sample information further collected based on the webpage of FIG. 3 by the process of FIG. 2, consistent with certain disclosed embodiments.

FIG. 2 is an exemplary flow schematic illustrating a process for performing routine collection of information associated with suspect activity, as further depicted in FIGS. 3 and 4, consistent with methods and systems of some embodiments. In one exemplary embodiment, one or more processes continually execute, or are continually spawned, for crawling the Internet and/or other network infrastructures to collect information that may be entered into a database against which digital media documents may be scored to evaluate the likelihood that such digital media documents are directed to various forms of social engineering attacks. The scoring process is detailed in much greater extent below. In step 210, a collection process accesses an initial webpage, such as through a standard HTTP request, and downloads its content for analysis.

The collection process may select the initial webpage or website using a number of different techniques. For example, the system may possess existing information about the website, domain name, URL, IP address, or other information associated with the webpage that indicates that the webpage or website may be associated with malicious activity. Such information may include lists of websites, IP addresses, or registrants associated with known previous malicious activity, such as previous social engineering attempts, spamming, malware or virus distribution or hosting, participation in rogue DNS or DNS cache poising activity, denial-of-service attacks, port scanning, association with botnets or other command-and-control operations, etc. Such lists may also comprise websites that, although not primarily engaged in malicious activity, have nonetheless been compromised in the past and therefore may serve as a likely conduit, unsuspecting or otherwise, for malicious activity originating from otherwise unknown sources.

Alternatively, while the initial webpage or website may not have any known previous malicious activity, it may nevertheless fall within one or more categories of content that have been empirically shown to have a higher correlation with malicious activity, such as pornographic sites; sites distributing pirated content; hacking, cracking, or "warez" sites; gambling sites; sites that attempt to entice web surfers with suspect offers, such as answering questions to obtain free merchandise; etc. For example, as depicted in FIG. 3, the collection process may analyze the content of web page 310 associated with URL 300 on account of the suspect nature of its content—e.g., pirating of copyrighted movies, music, software, or any other form of digital media.

As yet another alternative, the system may engage in random or routine web crawling, with the expectation that the vast majority of websites will ultimately be categorized as innocuous. In certain embodiments "crawling" may include downloading a webpage's content through HTTP request/response, JavaScript, AJAX, or other standard web operations; parsing the received content for IP addresses, URLs, or other links to other webpages, websites, or network devices; and then repeating the process for one or more links in a recursive manner.

In step 220, the downloaded webpage content is analyzed, either by the process that collected the data or by another process, such as a process devoted entirely to content analysis. The webpage content is analyzed for indications of potential malicious activity. As previously described, such malicious activity may include, for example, social engineering, spamming, malware distribution or hosting, botnet activity, spoofing, or any other type of activity that is illegal, generally prohibited, or generally regarded as suspect or disreputable. Detecting malicious or potentially malicious activity may be accomplished using a number of different techniques, such as identifying various red-flag keywords; detecting the presence of official logos, banners, or other brand indicia that may suggest the impersonation of an otherwise reputable company; downloading files from the website to determine whether they include malware or other viruses (such as through the use of signature strings); or other techniques.

For example, as depicted in FIG. 3, the collection process may download the HTML returned by making an HTTP "GET" request to URL 300, along with any embedded elements within the HTML. These elements, which if displayed in a standard browser, could resemble web page 310. URL 300 may be selected on account of previously known information about the content hosted by that URL—for example, evidence of pirating of copyright-protected media such as movies, music or software—or the suspicious web page 310 may be encountered randomly through the previously mentioned web crawling operations. URL 300 may also be selected on account of its inclusion in data feeds, such as feeds identifying newly registered domain names or feeds disclosing known bad actors in cyberspace.

In the event that indicia of malicious activity are detected (step 230, Yes), the webpage, website or other digital information source is then processed to identify and collect various pieces of identification information or metadata (step 240). Such identification information may include the URL of the webpage or any other information associated with the website hosting the particular webpage. Identification information may be stored in, for example, a database, or any other data store.

For example, content in web page 310 may be analyzed and could be determined to be associated with pirating activity. As a result, the system may catalog URL 300, along with various constituent parts of the URL 300, such as its second-level domain 411 and sub-domains 412 and 413. Additionally, using standard Domain Name Service (DNS) lookup operations, it may be determined that domains 411, 412, and/or 413 are hosted by various IP addresses, such as IP addresses 430. IP addresses 430 may then additionally be subjected to further scrutiny, such as a geo-location investigation. In this example, a geo-location investigation would reveal that each of the IP addresses is hosted in Russia, a known hot spot for servers engaged in illegal cyber activity. The domains and/or IP addresses may be further queried to reveal additional information, such as the web page 310 registrants 420. In FIG. 4a, such as registrant 420. All such information comprises "identification information" about the webpage, and can be collected and stored in step 240. Many other pieces of identification information could also be gleaned from URL 300 and web page 310. Moreover, it is not necessary that the process that crawls the Internet and collects data be the same process that analyzes the collected data. In an alternative embodiment, the collection process may be devoted primarily to collecting data, which data is forwarded to other processes for analysis.

In step 250, the web page 310 may be further analyzed to obtain links to other web pages, websites, objects, domains, servers, or other resources to examine for potential malicious activity. "Links" may include, for example, hyperlinks, URLs, and any other information that may be used to identify additional data or items in a network for analysis. For example, in FIG. 4, the second-level domain 411 of URL 300 may be considered a "link" since it can be used to derive IP addresses 430 at which the second-level domain 411 is hosted, and registrant 420, the owner of domain 411. Registrant 420 is also a "link," since it may be analyzed to determine other IP addresses, domains, or websites owned by the registrant. For example, a reverse-DNS lookup may be performed on IP address 431, which may reveal that additional domains 440 are hosted at IP address 431, the same IP address that hosts domain 411. HTTP requests may then be made to each of domains 440 to determine whether such websites also contain malicious activity or information useful for crawling. Likewise, the range of IP addresses 430 may also be considered a "link," since it may be inferred that other IP addresses (not listed) falling within that range or associated with a similar geographical IP range may be suspect.

Likewise, web page 310 displays several hyperlinks 311-314, from which additional URLs 320, 330, and 340 may be gleaned. HTTP requests may be made to each such URL to analyze the content of each associated website. URL 320, in particular, links to an executable program file 450. Executable program file 450 may be downloaded and analyzed to determine whether it contains any malware or similar malicious characteristics. For example, comparing a part 451 of the executable file 450 with virus signature 460, it may be determined that executable file 450 harbors a virus or other form of malware. Based on such a determination, executable file 450 may be further analyzed for information that can be catalogued and used as links. For example, analysis of the binary information of executable file 450 may reveal a string 452 that references a domain name 470.

Since the foregoing process of identifying links could, in many cases, go on forever, the crawling process may need to make a threshold determination of whether to pursue any of the links gleaned from the webpage (step 260). In the event that the crawling process decides to pursue any of the links, each such link may then become the seed for conducting the entire analysis process all over again, beginning at step 210. In the event that the crawling process decides that it is not a valuable use of system resources to pursue any of the identified links—for example, if the analyzed web page 310 were determined to be completely innocuous, or if it were the third innocuous web page 310 in the recently traversed crawling chain (suggesting that the crawling process has reached a "dead end"), the crawling process may terminate the current chain. The crawling process may then communicate with other system processes to obtain new starting points or "seeds" for crawling.

Figure 5:
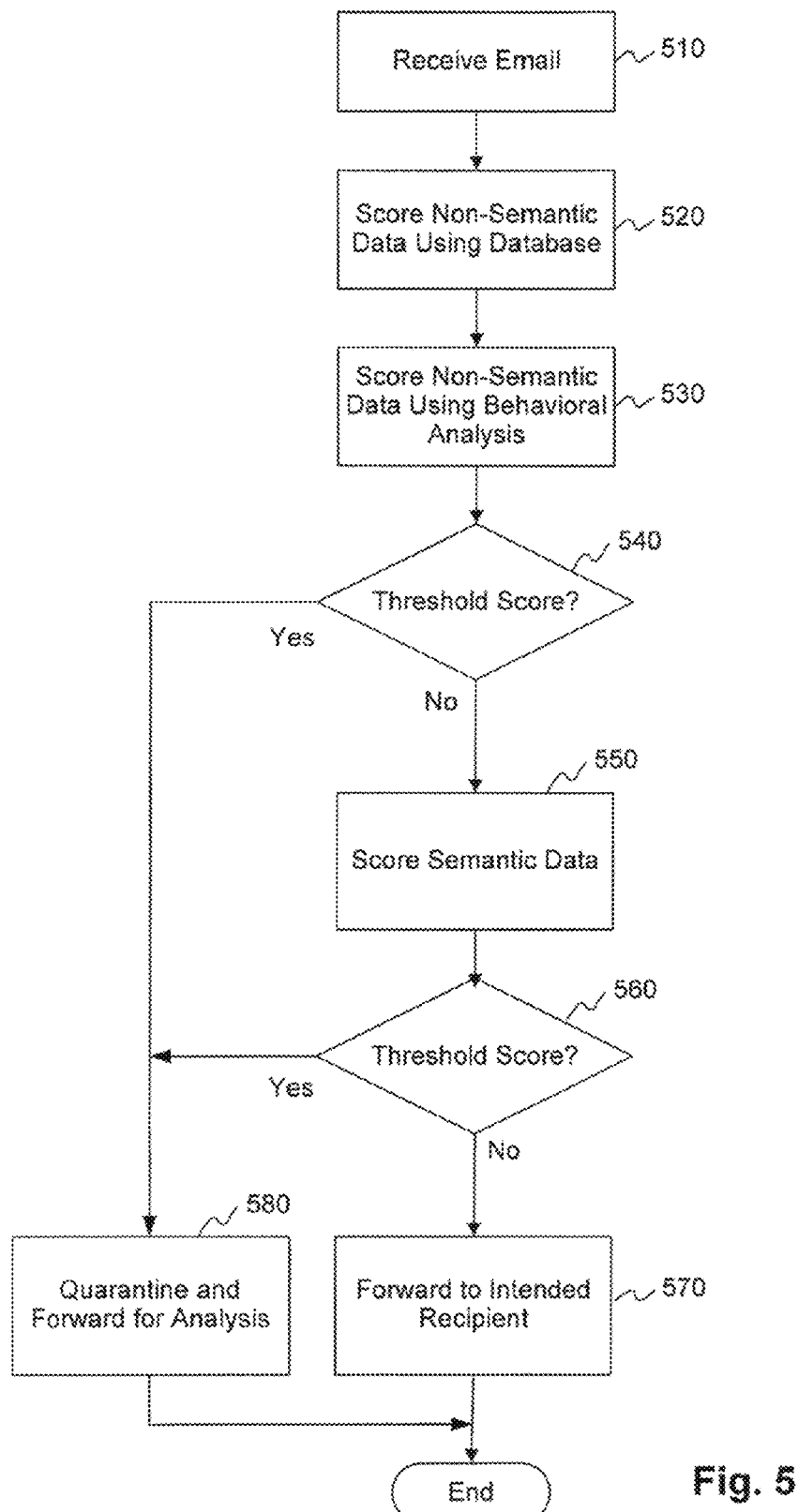
FIG. 5 is an exemplary flow schematic illustrating a method of analyzing an incoming digital media document for evidence of a social engineering attack, consistent with certain disclosed embodiments.
Figure 6:
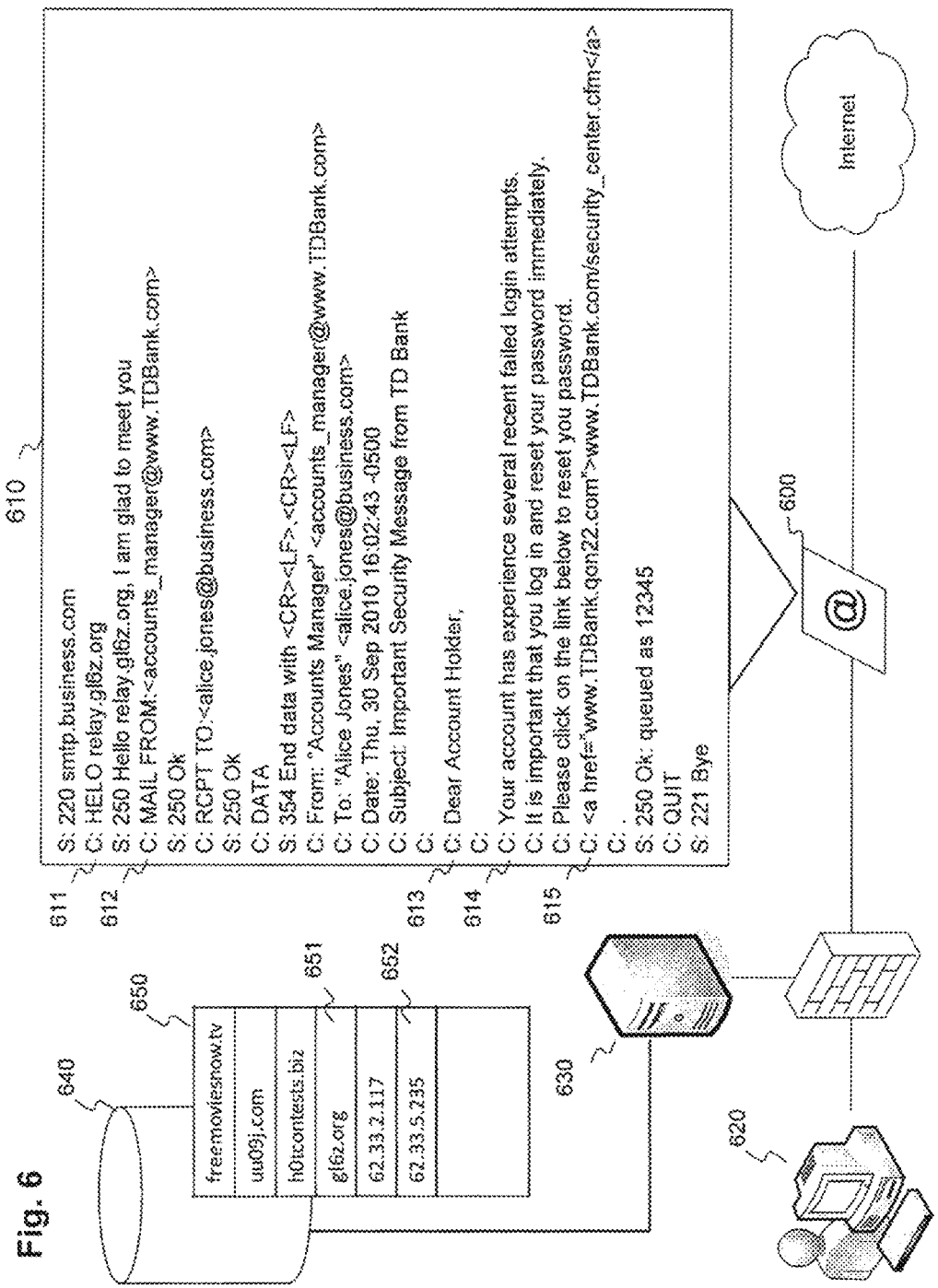
FIG. 6 is a schematic illustrating an exemplary digital media document analyzed for evidence of a social engineering attack, consistent with certain disclosed embodiments.

As depicted in FIGS. 5 and 6, the information collected in FIGS. 2-4 may then be used to proactively identify and guard against social engineering attacks, such as "phishing"

email attempts. The process may begin when an email 600, is sent from a computer outside of network 110 (not shown) to a user (or user device) 620 within network 110 (step 510). However, prior to arriving at user 620, email 600 may first have to pass through device 630. Device 630 may be, for example, a Simple Mail Transfer Protocol (SMTP) server tasked with the process of receiving incoming mail and storing such mail for access by user devices using protocols such as the Post Office Protocol-Version 3 (POP3) or Internet Mail Access Protocol (IMAP). Alternatively, device 630 may be a dedicated security device that interfaces with one or more SMTP servers to analyze emails received by the SMTP servers before they are ultimately forwarded to the intended recipients or made available for review through POP3 or IMAP.

Device 630 analyzes the content 610 of email 600 for both semantic and non-semantic data. In some embodiments, "non-semantic data" may be data that can be easily harvested from the content of an email and compared with identification information—for example, URLs, domain names, IP addresses, email addresses, etc.—to obtain accurate, objective comparisons or matches with previously archived identification information. "Semantic data" may refer to information contained in the email that cannot easily be compared with previously archived information, such as through simple string matching techniques, but instead are usually analyzed to find patterns suggestive of a social engineering attack.

For example, one characteristic typical of phishing attempts is to include hyperlinks (using the HTML anchor tag) within the email text that appear to point to a trusted location, by placing a well-known location in the text of the anchor tag, yet actually provide a different URL (pointing to an impostor site) in the anchor's target attribute. For example, as shown in FIG. 6, email 600 includes a hyperlink 615 in its content 610. Because of how anchor tags are displayed in HTML, the text "www.TDBank.com/security_center.cfm" is the URL that will ultimately be displayed when a user views email 600 in a browser or email client. However, because the anchor tag specifies the URL "www.TDBank.qon22.com" as its target, that is the location to which the user will ultimately be directed (likely a fraudulent website) if the user clicks on the displayed link. The user who is not technically savvy is thus deceived into believing that he or she is visiting the webpage "www.TDBank.com/security_center.cfm" after clicking on the link because that is the text that is displayed.

Therefore, device 630 may identify such URL mismatches and recognize email 600 as a potential phishing attack as a result. The component URLs of such a mismatch may be considered non-semantic information individually, since they could each be queried against a database 640 to determine whether they match URLs that have been previously identified as malicious. However, in the event that neither URL is recognized as malicious by itself, their malicious nature might only be discernible when evaluated in the overall context of how they are used—in this case, as part of an anchor tag whose text does not match its target. It is in that sense that such information is "semantic" and are usually analyzed for internal or contextual patterns in order to understand its malicious nature. Semantic information may also comprise various keywords typically associated with social engineering attacks.

Returning to the example of FIGS. 5 and 6, in step 520, device 630 analyzes email 600 to score its non-semantic data against database 640. Device 630 first examines the content 610 of email 600 to extract any and all non-semantic data.

As shown in FIG. 6, content 610 reflects the standard SMTP communications that may occur when an email is sent to an SMTP server. For purposes of illustration only, each line preceded with "S:" indicates a message sent from the SMTP server (e.g., device 630) to the SMTP client (not shown) that is attempting to send email 600. Likewise, each line preceded with "C:" indicates a message sent from the SMTP client to the SMTP server.

In some embodiments, the SMTP client will first attempt to initiate communication with the SMTP server by requesting a TCP connection with the SMTP server, specifying port number 25. In response, the SMTP server will respond with a status code of 220, which corresponds to a "Service ready" message in SMTP (i.e., that the SMTP server is ready to receive an email from the SMTP client). The SMTP client then identifies itself by issuing the "HELO" command and identifying its domain information. The foregoing back-and-forth communications between the SMTP client and SMTP servers are known as SMTP headers, which precede the body of the email to be transmitted. During this process, several other SMTP headers are transmitted that specify information such as the alleged sender of the email (here "accounts manager@www.TDBank.com") and the intended email recipient (here "alice.jones@business.com"). It is important to note at this point that the actual sender of the email may specify any email address as the alleged sender of the email regardless of whether such an address is accurate or not. When an emailer purposely provides a false sender email address in the SMTP header for the purpose of making it appear that the email has come from a different person, such a technique is known as email "spoofing."

Once the SMTP headers have been exchanged, the SMTP client alerts the SMTP server that all following data represents the body of the email using the "DATA" command. Thereafter, each line of text transmitted by the SMTP client goes unanswered by the SMTP server until the SMTP provides a textual marker that indicates that it has completed transmitting the email body, for example using a single period mark flanked by carriage returns and line feeds.

Characteristics of SMTP—for example, the exchange of SMTP headers prior to the transmission of the email body—support real-time, in-line interception of social engineering attacks. That is, although some information in the SMTP headers may be spoofed, other identification information are usually accurate in order for the SMTP client to successfully send the email. Because identification information such as domain names and IP addresses may first be obtained from the SMTP client, the SMTP server (e.g., device 630) may perform initial analysis on such identification information before accepting the remaining email body data. For example, device 630 may query the identified domain name, or its corresponding IP addresses, against a database 640 of previously archived malicious domain names and IP addresses. Alternatively, device 630 may perform real-time investigation of content hosted at the identified domain name or IP address (if such information is not already archived) to determine whether they point to websites that are malicious in nature. This characteristic of SMTP thus presents security advantages over other communication protocols in the OSI Application Layer, such as HTTP, which receives both message headers and body from the client in one operation, without substantive server-client message exchanges that precede the transmission of the message body. However, those skilled in the art will appreciate that some of the embodiments are not limited to analyzing emails sent using SMTP, but may also be applied to emails and similar forms of network communication using other protocols, such as Microsoft's Exchange protocol.

Thus, using email 600 as an example, in step 520, device 630 extracts non-semantic data, e.g., data 611 ("relay.g16z.org") and 612 ("accounts manager@www.TDBank.com") from the SMTP headers of content 610. Security device 630 may also elect to receive the body of email 600 in order to further glean any non-semantic data therefrom as well, such as the URLs in line 615. Also, although not shown, the IP address of the SMTP client that initiated the opening TCP connection may also be gleaned as non-semantic data. Such data is then queried against database 640 to see whether there are any previous records in database 640 that identify such URLs, domain names, IP addresses, or email addresses as malicious or suspect. In the example of FIG. 6, it can be seen that the domain name "g16z.org" is already stored as a record 651 in a database table 650 of malicious or suspect domain names and IP addresses.

Records in database 640 may be created using the crawling and collection process described with respect to FIGS. 2-4. Thus, it can be seen that each visible record in database table 650 corresponds to information collected after analyzing URL 300 and several links therefrom. In particular, the domain name "g16z.org," which is found in email 600, was originally identified and entered into database 640 after malicious executable program file 450 was downloaded from URL 320 and its binary data was analyzed to extract domain and URL strings.

Database 640 may additionally or alternatively be populated using data from government, proprietary, or other available feeds detailing cyber threat and/or other security information, such as various whitelists, blacklists, or reputational data. For example, database 640 may include data that may be used to positively identify an email as benign (rather than to identify it as malicious) using whitelist information, such as reputational classifications for known domain names or IP addresses. For purposes of various embodiments, it should be understood that database 640 may be populated in any manner to achieve a readily accessible and searchable archive of information that may be used to analyze incoming information, preferably in real-time, for the purpose of detecting and evaluating potential threats.

In the event that one or more non-semantic data items match data stored in database 640, email 600 may be flagged as potentially suspect. Alternatively, in order to provide a more nuanced approach to detecting cyber threats and to avoid a disproportionate number of false positives, the nature and number of matches may be quantified into a numerical or other type of score that indicates the likelihood that the email represents a social engineering or other form of attack.

In the event that the extracted non-semantic data items do not match any, or a sufficient amount of, data stored in database 640, real-time behavioral analysis may be performed to analyze the non-semantic data items (step 530). "Behavioral analysis" may include analyzing non-semantic data using information or resources other than those that have previously been compiled. For example, in one embodiment, device 630 may perform behavioral analysis on extracted data items, such as domain names, by launching a virtual browser to connect to servers hosting such domain names to determine whether they host websites that are malicious in nature (e.g., constructed to fraudulently pose as other, legitimate websites). In certain embodiments, "behavioral analysis" may encompass any type of analysis similar to that which would be performed on URLs, domain names, IP addresses, or similar links during the crawling and collection operations described with respect to FIGS. 2-4.

Thus, for example, since the domain name "www.TDBank.qon22.com" does not match any record in table 650, a reverse-DNS lookup is performed on the domain name "qon22.com," which reveals an IP address of 62.33.5.235 (operations not depicted). Since the IP address 62.35.5.235 does match record 652 in table 650, real-time behavioral analysis has revealed the suspect nature of the domain name "qon22.com" even though no information was previously stored about that domain name. If the resulting IP address had not matched, behavioral analysis may have comprised making an HTTP request to "www.TDBank.qon22.com" and analyzing the HTML or other content returned.

After analyzing all non-semantic data, for example by querying against database 640 and by using behavioral analysis, one or more numerical or other kinds of scores may be generated to determine whether a sufficient threshold has been met to consider the email malicious in nature (step 540).

If the email's non-semantic score meets or exceeds a threshold score, the email may be flagged as potentially suspect, quarantined, and forwarded for analysis (step 580). If the email's non-semantic score does not meet the threshold score, semantic analysis may then be performed on the email (step 550). For example, at least four semantic cues may be found in content 610 to indicate that email 600 may be fraudulent. First, as described above, the mismatch between the URL specified by the target of anchor tag 615 and the URL text anchored by the tag may indicate an attempt to deceive the user as to the target of the displayed hyperlink.

Second, the URL "www.TDBank.qon22.com" itself may provide a semantic cue. In the Domain Name System, only the second level domain name (i.e., the name preceding the generic top-level domain, such as ".com," ".edu," or ".org") are usually registered. However, the domain name owner is then free to specify any number of additional sub-domains to precede the second-level domain in a URL. Thus, while there may be only one "TDBank.com," any other domain may use the text "TDBank" as a sub-domain name without the authorization or knowledge of the owner of "TDBank.com." In this example, the sender of email 600 has used the well-known text "TDBank" as a sub-domain of the otherwise unknown "qon22.com" domain name. Because unwary users might confuse "www.TDBank.qon22.com" with a website under the "TDBank.com" second-level domain (e.g., "www.qon22.TDBank.com" or "www.TDBank.com/qon22"), the use of a well-known domain name as a sub-domain name may therefore be a semantic indication of potential fraud.

Third, the use of the generic salutation "Dear Account Holder" in line 613 may additionally signal a potential social engineering attack, since legitimate web sites and other institutions will typically include some type of private user account information, such a username, surname, or account number to demonstrate their authenticity. Finally, the occurrence of spelling or other grammatical mistakes 614 may also indicate potential fraudulent status.

Such semantic patterns may also be quantified and combined to produce a numerical or other type of score. If the email still does not meet a particular threshold score (step 560), the email may be regarded as non-malicious and may be forwarded to its intended recipient (step 570).

In one embodiment, if an email has been flagged as suspect or malicious, the email is then forwarded for analyst review. For example, the email may be forwarded to a human operator who may further analyze the email to determine whether it was correctly flagged as malicious (i.e., to rectify false positives). Preferably, analyst review is conducted using an interactive electronic system in which an analyst may be presented with various emails, or excerpts of emails, and prompted for input about the emails, such as the analyst's opinion about the legitimacy of the emails. The analyst may additionally have at his or her disposal a browser, telnet client, or other kind of communications program for performing additional investigation as to the legitimacy of the email.

Figure 7:
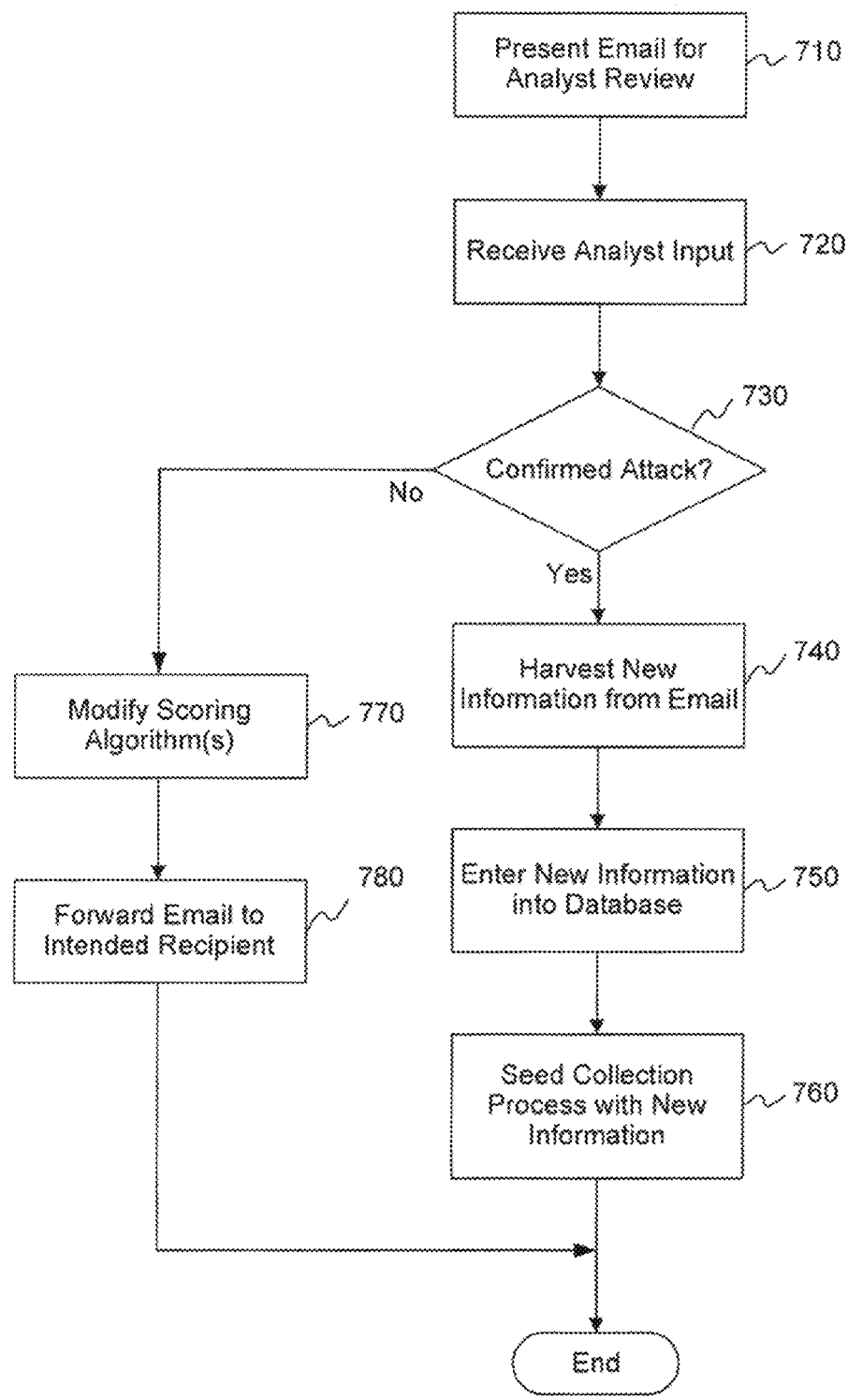
FIG. 7 is an exemplary flow schematic illustrating a method of analyzing a digital media document flagged as a potential social engineering attack, consistent with certain disclosed embodiments.

Referring now to FIG. 7, in step 710, an email that was flagged as potentially malicious may be presented to an analyst for review. After reviewing the email, the analyst provides his or her input about the email (step 720). Although such input may typically be the analyst's opinion as to whether the email was correctly flagged as fraudulent by the automated algorithms of FIG. 5, the analyst may further provide any other kind of input that might require human review or otherwise relate to assessments that could not be made by automated processes.

In the event that the analyst confirms that the email is a social engineering attack or other form of malicious email (step 730), the email may be then be further analyzed for identification or other information for use in either identifying the perpetrator of the email or identifying other potential threats (step 740). For example, a WHOIS inquiry may be made with respect to the domain information in item 611 to identify the registrant of the domain or the geographic location of the IP address that hosts the domain. Such information may also be entered into database 640 to be used to identify further social engineering attempts that include one or more pieces of the same information (step 750). Moreover, such information may be used to seed the collection process described with respect to FIGS. 2-4 to collect additional threat information to be entered into database 640 (step 760).

In the event that the analyst identifies a false positive, the email may be fed back into one or more automated processes (either with or without analyst input into reasons for the false positive) and one or more scoring algorithms may be modified so as to not erroneously flag emails as malicious based on the same reasons for the current false positive—i.e., to further machine learning and optimization of scoring processes (step 770). Finally, the email may be forwarded to the intended recipient (step 780).

Figure 8:
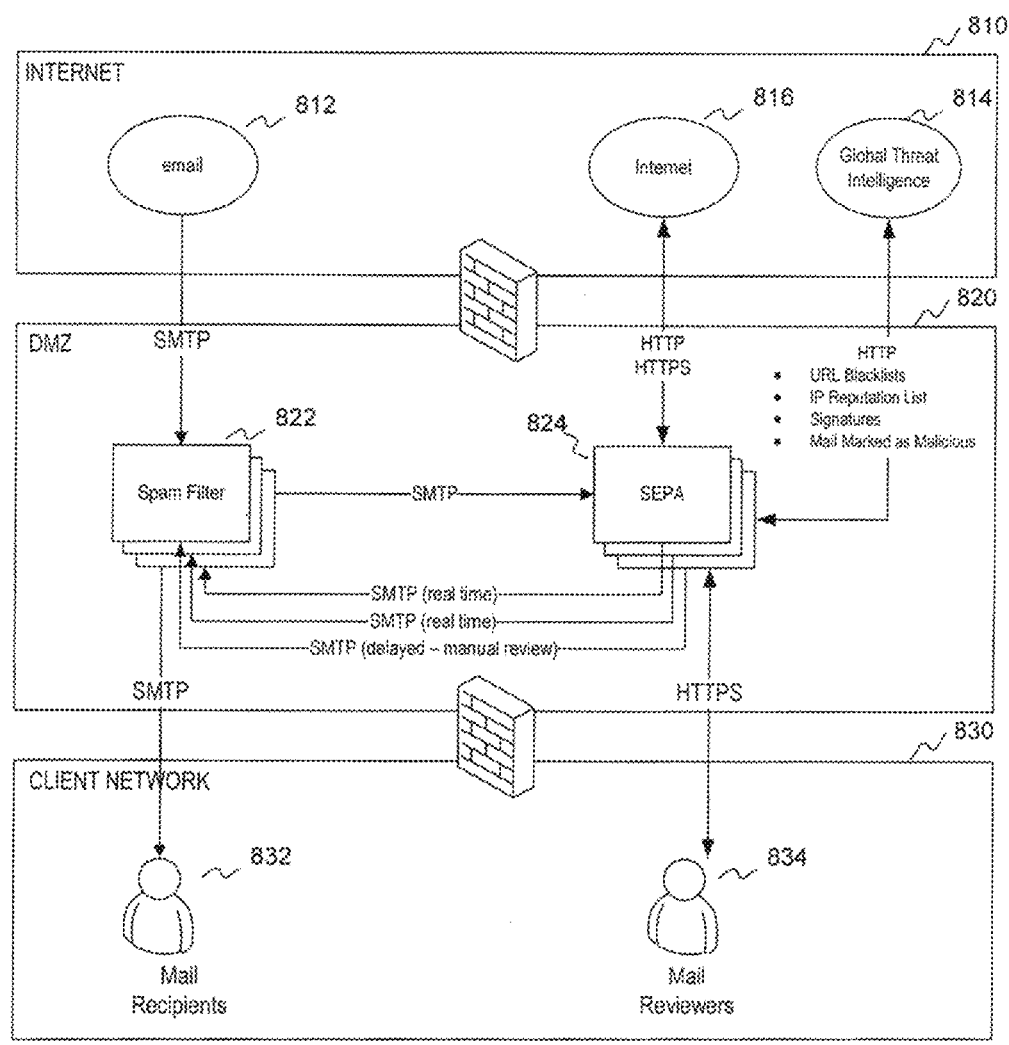
FIG. 8 is a schematic depicting an exemplary system for implementing methods consistent with certain disclosed embodiments.

FIG. 8 is a schematic depicting an exemplary system for implementing methods consistent with certain disclosed embodiments. In the system of FIG. 8, an email 812 intended for recipient 832 within client network 830 is sent from a device (not shown) within the Internet 810. However, prior to entering client network 830, email 812 usually first pass through one or more security devices 822 within a security layer 820, for example, a device that is specially configured to detect and quarantine spam. After determining whether email 812 is spam, security device 822 may forward email 812 to a separate security device 824 (e.g., via SMTP).

An important aspect of some of the embodiments is that security device 824 may employ one or more of four distinct operations to determine whether email 812 may be a social engineering attack. First (although the order of these operations is flexible), security device 824 may extract various pieces of information, such as non-semantic and identification information, from email 812 to determine whether the email may be malicious by querying information associated with the email against a database of previously collected security information. Such security information may be collected by various web-crawling and investigative processes, such as those described with respect to FIGS. 2-4, and may be provided, for example, by one or more systems 814. Alternatively or additionally, system 814 may provide data collected from other proprietary or governmental sources, such as URL blacklists, IP reputation lists, or virus, malware, or other signature strings. Security device 824 and system 814 may be operatively coupled or may communicate via a communications protocol such as HTTP that allows security device 824 and system 814 to be separately geographically located.

Second, security device 824 may additionally perform real-time behavioral analysis by communicating with other devices connected to the Internet 816 that are referenced by or related to email 812. For example, security device 824 may make HTTP requests to websites using URL, domain, or IP address information associated with email 812. Security device 824 may analyze content received from devices 816, such as to determine whether websites hosted by devices 816 are fraudulent in nature, host malware, or link to other malicious websites.

Third, security device 824 may analyze the semantic content of email 812 to determine whether it matches any patterns associated with social engineering attacks. Security device 824 may perform this operation alone, may also utilize system 814, or may delegate the task entirely to system 814.

Fourth, security device 824 may forward email 812 to one or more analysts, such as mail reviewers 834 within client network 830 for manual analysis. Mail reviewers 834 may review email 812 to determine whether it was correctly flagged as malicious or incorrectly flagged as innocuous. In addition, mail reviewers 834 may perform additional analysis on email 812 in the event that they determine it to be malicious, such as collecting additional information for analysis or investigation.

In the event that email 812 is not deemed malicious by one or more of the above four processes, it is forwarded to its intended recipient 832. Important for purposes of various embodiments is that the system of FIG. 8 is able to analyze email 812 in real-time and within the flow of the email, such that the email may be received by device 822, analyzed by security device 824, and, if deemed to be innocuous, forwarded to its intended recipient 832 without introducing significant delays that would be observable by users as distinct from the normal delays associated with receiving emails from outside of network 830 (although delays could be introduced in the event that manual review is necessitated).

Figure 9:
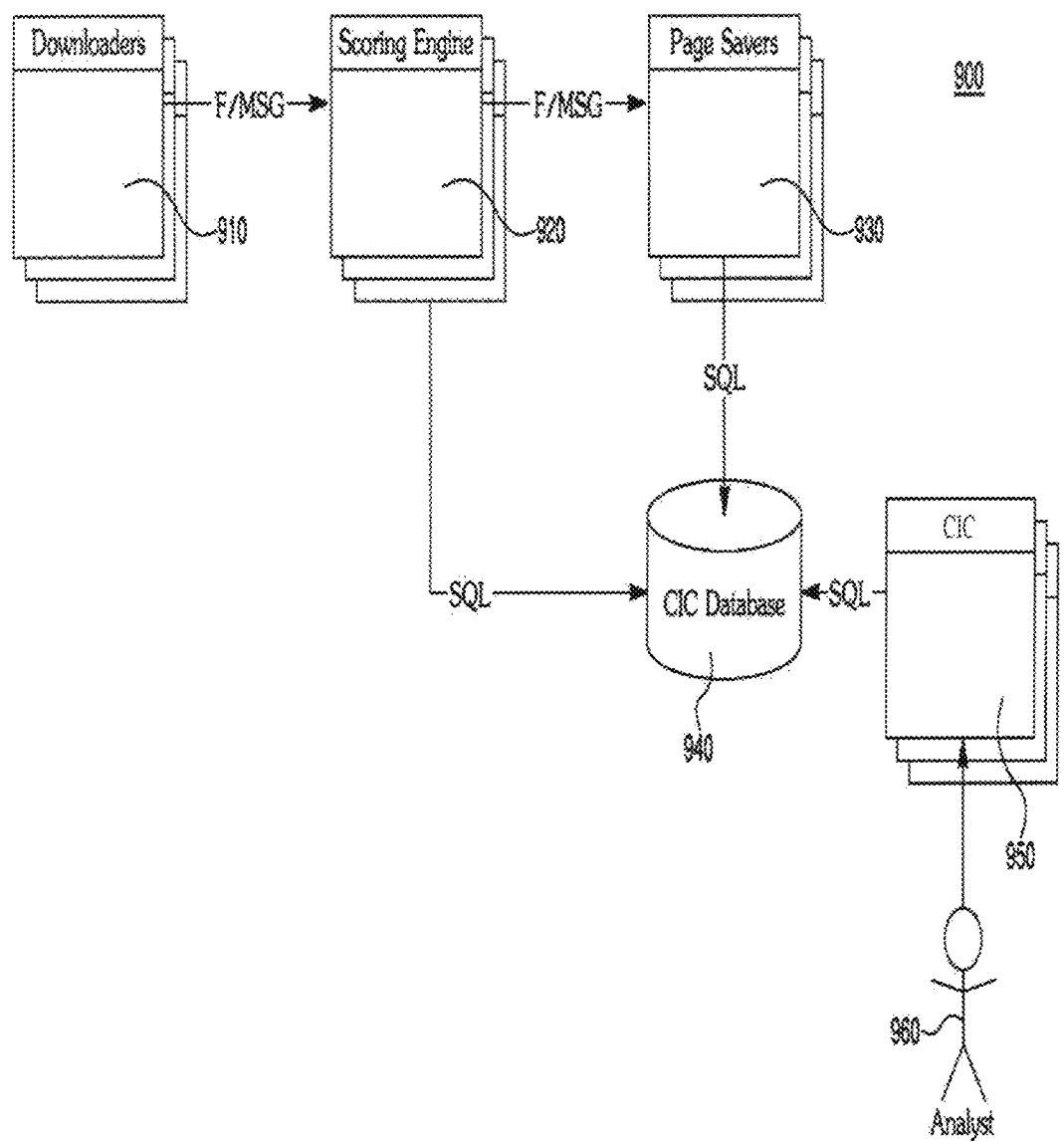
FIG. 9 is a schematic depicting a system architecture for a scoring engine consistent with certain disclosed embodiments.

FIG. 9 begins the discussion of the technical aspects of the scoring process. A Table of Contents regarding this process is provided, followed by the detailed description of the methods used to score one or more potentially malicious digital media documents.

3. Technical Details of the Scoring Process 3.1 Overview

In FIG. 9, the scoring engine 920 application is an element of one or more system's backend distributed application. All potential data sources may feed documents into the scoring engine 920 for processing. The scoring engine 920's primary responsibility is usually to determine which documents are relevant enough to store in a CIC 950 database 940 for future delivery to a consumer, analyst, or anyone else. FIG. 9 illustrates an embodiment depicting a possible relationship between each of the elements document downloaders 910, scoring engine 920, page savers 930, CIC 950 database 940, and CIC 950.

Relevancy of a digital media document (such as an email, website, etc.) may be determined in any number of ways. In some embodiments, relevancy is determined by applying one or more text processing formulas (generally referred to as word expressions), and could be used in conjunction with various computer languages or protocols, such as JavaScript, C#, C++, Android, etc. These programs (which can also be referred to as algorithms, scripts, routines, sub-routines, code segments, snippets, etc.) may be used to assess information present in a source document attained by document downloaders 910. Document downloaders 910 could take any form, such as in information-seeking/delivering web crawlers, email monitoring software, or any other form of hardware, software, or combination thereof. The document downloaders 910 are usually designed to be capable of acquiring digital information, such as information contained in or referenced by emails or email links, websites, website links, electronic advertisements, etc.

Word expressions often perform the "heavy lifting" of the scoring process. Word expressions are usually mathematical equations, where the variables in the equations might represent, for example, a number of occurrences of keywords, patterns, or otherwise identifiably potentially malicious trends in the digital media document text. The word expression engine is usually optimized to efficiently search for thousands of various patterns in a document.

The scripts can also be used to perform various other forms of processing. Scripts are often written in JavaScript, although they may also be written in any other programming language. Accordingly, nearly any arbitrary piece of code intended to perform any arbitrary function can potentially be written and executed by the script. Most of the time, this process involves rolling up the results of the word expressions into a single page "score" which, when applied to a threshold, can be used to determine whether or not the document is relevant. In some other cases, a script can directly perform the processing against text of the digital media document itself.

Some goals for Scoring Engine 920 can include allowing a Java based CIC 950 to perform real-time and post-production scoring of documents in the system with results identical those of the backend application, adding support for report inheritance (i.e., a page will get scored using the formulas within it's own report and one or more of it's parent reports), reducing or eliminating message latency caused by context batching, making the implementation thread scalable instead of merely instance scalable (the current known art is singly threaded and usually runs in multiple processes to fully utilize server CPU; the extra process overhead, however, puts a high strain on memory resources), creating report specific monitoring for a script 1230 (see FIG. 12) execution time and message rate to help diagnose system load issues, improving debugging capabilities for misconfigured reports, and removing all "nom" dependencies in both the scoring engine 920 code and scripts 1230 in order to eliminate the need for frequent future maintenance of the "nom" code base (nom is a Nu library designed to translate s-expressions into HTML code. Because HTML (and XML) are basically reinventions of s-expressions, there is a pleasant isomorphism between the two. nom can translate a given s-expression or the contents of a file into HTML code).

3.2 Terminology

Various terms will now be used to describe certain embodiments. For example, the term Script 1230 will usually refer to JavaScript code used to help determine what action to take on a page found by the downloaders 910. Word Expression usually refers to a mathematical equation whose variables often represent the number of occurrences of specific keywords, patterns, etc. in the document text. Collection (in the context of CIC 950) generally identifies a list of keywords or patterns which get summed up to form the collection score. Collections are usually a subset of word expression functionality. The phrase Real-Time Scoring generally refers to an ability to execute scoring for a page synchronously within CIC 950. Real-Time Scoring is often used to tune word expressions and collections by examining exactly which words hit. The expression Post-Production Scoring may be used to describe code, such as JavaScript, that can be executed against a subset of pages marked for client delivery synchronously within CIC 950. Post-Production Scoring is often used to make batch updates to pages. Framework usually refers to a backend library written in any computing language, frequently including one or both of Java and C++ that handles common backend application requirements such as distributed processing, configuration file processing, etc. Finally, Context in relation to the scoring engine 920, usually refers to all scoring related objects associated with a report. This includes report settings, scripts (such as script 1230), collections, and word expressions.

3.3 Prototype

Prior to design and development of the scoring engine 920, a prototype was made in order to determine the feasibility of moving the scoring engine 920 over to the Java platform. After reviewing the prototype results the decision was made to design the next version of the Scoring engine 920 in Java for added functionality, accessibility, etc.

3.4 Specifications

Below are some of the specifications that may be of relevance to the scoring engine:

3.4.1 Architecture

Architecturally, the Scoring Engine 920 may be linearly scalable across application instances. A database connection should usually not be required by scripts (such as script 1230). Application(s) may often be able to run normally even when the database is down.

3.4.2 Input

Some of the following input properties/parameters/messages may be included in the scoring engine input data stream. One such message is UrlMessage. The receipt of a UrlMessage by the scoring engine 920 often means that a data source has found a document of interest and would like it scored for one or more reports. The following properties could be expected on the UrlMessage message: uri, which usually corresponds to the URI of the downloaded content to score against. content, which may refer to the content to score against. context, which normally contains client,report information needed to load appropriate scoring, date, which usually contains timestamp downloader received data (format: DDD, dd MMM YYYY HH:MM:SS+ZZZZ). Also, if this data is present, the data may be used to populate the object DownloadDate. Also stage_history may be present, which may represent a list of stages a message would go through up to a given point.

In addition to the aforementioned objects, the following objects/properties may be provided by the downloader and used in scripts (such as script 1230) but are not necessarily required on the message. For example, source could contain a blog name, message board name, or newsgroup from which the content was downloader. In one example, an author object could contain one or more authors of the content, which may be relevant for email, usenet, blogs, and message boards. subject: Subject parsed from the content. ipaddress may contain one or more IP addresses from which the content was downloaded from, and which could be relevant for web data sources. articleid may represent a source specific id from one or more vendors, such as "BoardReader", "Moreover", etc. postdate may contain or represent a timestamp url, and might be posted in the format: DDD, dd MMM YYYY HH:MM:SS+ZZZZ. postdate may be relevant for email, usenet, blogs, and message boards.

Other objects/properties that are not necessarily necessary are objects such as original_charset, which reflects a character set of raw downloaded source prior to a unicode conversion. This object may be relevant for all sources. Another could be original_codepage, which could contain or represent the codepage of the raw downloaded source prior to unicode conversion, and would likely be relevant for all sources. mimetype may represent the MIME data type of the content. serverstatuscode could represent HTTP or other protocol status codes returned by server. page. id can represent the ID of a page in a database if the requested page score or rescore is requested, or for any other reason. page.original_url may represent a URL as stored in the database if the page is requested or a rescore is requested. Requested is an object that is typically Boolean, and returns a 1 if the page is requested.

NextStageMessage objects can also be implemented, and are usually used to determine where to write UrlMessage objects after they have been processed by an application. Standard framework logic for next stage message processing and caching may also be used. StageMessage objects can also be used, and may determine the physical location of application instances on the network. Standard framework logic for stage message processing, broadcasting, and caching may also be used.

Scripts (such as script 1230) may also be employed, and often contain JavaScripts, word expressions, and collections used to score the UrlMessage objects received. Collections are frequently used in conjunction with scripts, and can be converted to word expressions by the configuration application used to create the scoring object. Script objects often contain the following properties: name (representing the name of the script or word expression. Names are frequently unique across the report); code, which can be a script or word expression to be executed by scoring engine 920; language (that could indicate the language of the text. This may be any language, but is often implemented with either JavaScript or WordExpression); type, which could be implemented as a string and could specify a type of script (examples include formula, topic, or subtopic). operationOrder usually refers to the order in which to process scripts (such as script 1230).

Reports can also be employed to convey information. A generic report may contain properties such as: Active, which can indicate or set when the status of messages for inactive reports are set to "done". ThresholdProp is another report attribute that usually represents a property name used to compare against a threshold. Threshold usually represents a threshold value used in comparison to make PASS or FAIL decisions. ThresholdFailResult is generally a result code to be used if a page fails to pass a predetermined threshold value, and can also control DISCARD or TRASH behaviors. ReportOwner is typically the email of an analyst in charge of a report. This address might be used to report errors in score formulas.

Exclusions. Exclusions are usually report specific urls, domains, or ip addresses that are often TRASHED regardless of scoring result. An exclusion may usually have the following properties: exclusion_text, which is exclusion information and depending on a match type (match_type), the text could be any of a url, domain, or host, and/or match_type which may be a url, domain, or sub-domain. Exclusions tests usually do not get performed for smtp protocol urls.

3.4.3 Output

The Scoring engine 920 output is often processed via standard framework message routing. Generally, only UrlMessage objects are sent from the Scoring engine 920. The following message properties are usually, by default, populated in an output stream: DownloadDate. This is typically a DB2 formatted timestamp. Most incoming message should have a date property. This value is desirable to be used if present. Otherwise, a current timestamp may be used if the value is not present. SourceStage. SourceStage is usually the stage that sent the most recent message to scoring engine 920. StageHistory. If a stage history of a message is >1, then Stage History is usually populated with a stage history, often comma delimited. topic_hits. topic_hits is typically a list of one or more word expression names, etc., often comma delimited, where the script type=topic and the result of a word expression is non-zero. subtopic_hits. subtopic_hits is typically a list of one or more word expression names, etc., often comma delimited, where the script type=subtopic and the result of a word expression is non-zero. topic_wordhits could be a list of one or more words, often comma delimited, found in the content along a number of occurrences of that word. Words in the list are usually words contained within topics. Format is often of the following format: WORD1{{cs=?,ww=?, regexp=?} }=COUNT1,WORD2{{ . . . } }=COUNT2, . . . etc. subtopic_wordhits usually refers to a list of one or more words, often comma delimited, found in the content along a number of occurrences of that word. Words in the list are usually words contained within subtopics. Title; if the content of a document is HTML, the Title will likely contain the text between the title tags. Sourcetype. The sourcetype is generally an integer value for the source of the message.

Mapping may be defined by an embodiment following the protocol exemplified in the following list.

```
DOWNLOADER_WEB = {sourcetype:1, sourcetypetext:'Web'}
DOWNLOADER_USENET = {sourcetype:2,
sourcetypetext:'Usenet'}
DOWNLOADER_MESSAGE_BOARD = {sourcetype:4,
sourcetypetext:'Message Board'}
DOWNLOADER_IRC = {sourcetype:5,
sourcetypetext:'IRC/Chat'}
DOWNLOADER_EMAIL = {sourcetype:6,
sourcetypetext:'Email'}
DOWNLOADER_SPAM = {sourcetype:6, sourcetypetext:'Email'}
DOWNLOADER_BLOGS = {sourcetype:7, sourcetypetext:'Blog'}
UNKNOWN = {sourcetype:3, sourcetypetext:'Unknown'}
```

In this context, the sourcetypetext would often represent a text friendly version of the source stage of the message. The subject, if not present in an input message, may be the page Title. If no Title is present, then the subject may be empty. source is a variable or field that, if not present on an input message, may represent the domain. If the domain not available then the source may be empty. Finally, the ErrorString is usually an error message containing scoring details.

4. Scoring

4.1 Word Expressions

Usually, all rows in a NONCLIENT.FORMULA_UNION where stage=SCRIPT_ENGINE, report=[report in message context], and language='WordExpression' are computed for each document. The value of the word expression may be placed on the message using the collection name as the property name. Collections often apply or refer to all rows in a NONCLIENT.SCORE_FORMULA_UNION where stage=SCRIPT_ENGINE and report=[report in message context] might be computed for each document. The value of the collection may be placed on the message using the collection name as the property name.

Collections are usually computed as being a sum of word counts for each row in NONCLIENT.SCORE_WORD. For example, if score words are {cat, dog}, then the collection score for the content "The dog jumped over the cat and then the cat went under the bed." would be 3 {cat=2,dog=1}. Score words generally support most boolean operations. For example, some properties that are supported include properties such as case sensitive, which if set, performs case sensitive matching; another property, Whole Word, matches only whether the score word is bounded on the left and right by a boundary character if set; maxcount is another property, and can represent a number indicating the maximum value that the word count can be (i.e., in the example above if maxcount was for cat then the value of the collection would have been 2); Regular Expression, which if set, treats score word(s) as (a) regular expression(s); Tag which, if set, matches only whether the word was found between specified HTML tag(s). Collections may be converted to word expressions for uniform processing. The word expression syntax fully supports each or all of the above requirements.

4.2 Scripts

Rows in NONCLIENT.FORMULA where stage=SCRIPT ENGINE, report=[report in message context], and language='JavaScript' may be computed for each document. The value of the script may be placed on the message using the script name as the property name. A script will frequently be a single parameter method with a signature resembling or identical function script_name(Page).

A Page object usually supports the interfaces such as string properties. Some of these string properties could be: getProperty(String propertyName), void setProperty(String propertyName,Object property Value), and Set<String>getPropertyNames( ) Some properties can be populated on the page object by the scoring engine 920 for use in scripts (such as script 1230), such as Name (usually a string object containing one or more urls), Content (a string object of downloaded content), Title (a string object text between <TITLE> HTML tags if content is HTML), DownloadDate (a string object containing DB2 formatted timestamp provided for data source), DomainName (a string object containing domain parsed from url), URL (the URL of an object), or Domain (the Domain of an object).

Normally, the Domain and URL objects should have the same getProperty/setProperty interface as the Page. Some properties are also usually populated on the URL object by the scoring engine 920 for use in scripts (such as script 1230); for example: Protocol, Port, Name, HostName, DomainName, and TLD. The TLD property(ies) are usually populated on the Domain object by the scoring engine 920 for use in scripts (such as script 1230).

In addition to standard HTML tags, custom (or virtual) tags can be used in collections and word expressions to score meta data not found in the content. For example, tags may be used such as ANY, which can trigger a look for the score word anywhere in the content property; INURL, which might trigger a look for the score word in the url; INDOMAIN, which could trigger a look for the score word in the domain of the url; INHOST, which might trigger a look for the score word in the host of the url; INSMTPAUTHOR, which may trigger a look for the score word in the author message property; or SUBJECT, which could trigger a look for the score word in the subject message property. If possible, the custom tag implementation may be generalized to all message properties. Further, all word expression or script processing errors may be alerted using the framework alerting service. Mail may be sent to report owner and scoring engine 920 administrator.

4.2.1 Real Time Scoring

CIC 950 users may be able to score an entire page in real time within CIC 950 and view the scoring results from a browser, user interface (UI), email, text message, etc. CIC 950 users may also be able to score a single collection or script in real time within CIC 950 and view the scoring results in any of the aforementioned ways. Further, an emblem or digital stamp, which may or may not be visible, may be provided on the page that alerts the user, browser, or other application that the page is legitimate or illegitimate.

4.2.2 Post-Production Scoring

CIC 950 users may be able to score a batch of pages in real time within CIC 950 against a single script and save the results. These results could be analyzed by subsequent algorithms, processes, or even people such as the user or a third party entity reviewing one or more pages for malicious content. An emblem or digital stamp, which may or may not be visible, may be provided on the page that alerts the user, browser, or other application that the page is legitimate or illegitimate.

5. Design

5.1 Systems Architecture

The systems architecture 900 for the scoring engine 920 is described in FIG. 9. This architecture is similar to the architecture currently running in production. In some embodiments, the CIC database 940 actions performed by the scoring engine 920 are performed within scoring engine 920 code. In other embodiments, the scripts (such as script 1230) executing within the scoring engine 920 do not directly interact with the CIC database 940, if at all. As may be seen in FIG. 9, the Downloaders 910 could be configured to interact directly or indirectly with the Scoring Engine 920. The Scoring Engine 920 may, in turn, interact directly or indirectly with the Page savers 930, the CIC Database 940, or even with the CIC 950 (not shown in FIG. 9). The Page savers 930 may likewise interact directly or indirectly with the CIC Database 940 and/or the CIC 950 (not shown in FIG. 9). An analyst 960 may then access the CIC 950 through any number of means to make determinations as to whether a suspicious digital media document (such as an email or webpage) is determined to be malicious.

5.2 Scoring Engine

5.2.1 Application Data Flow

Figure 10:
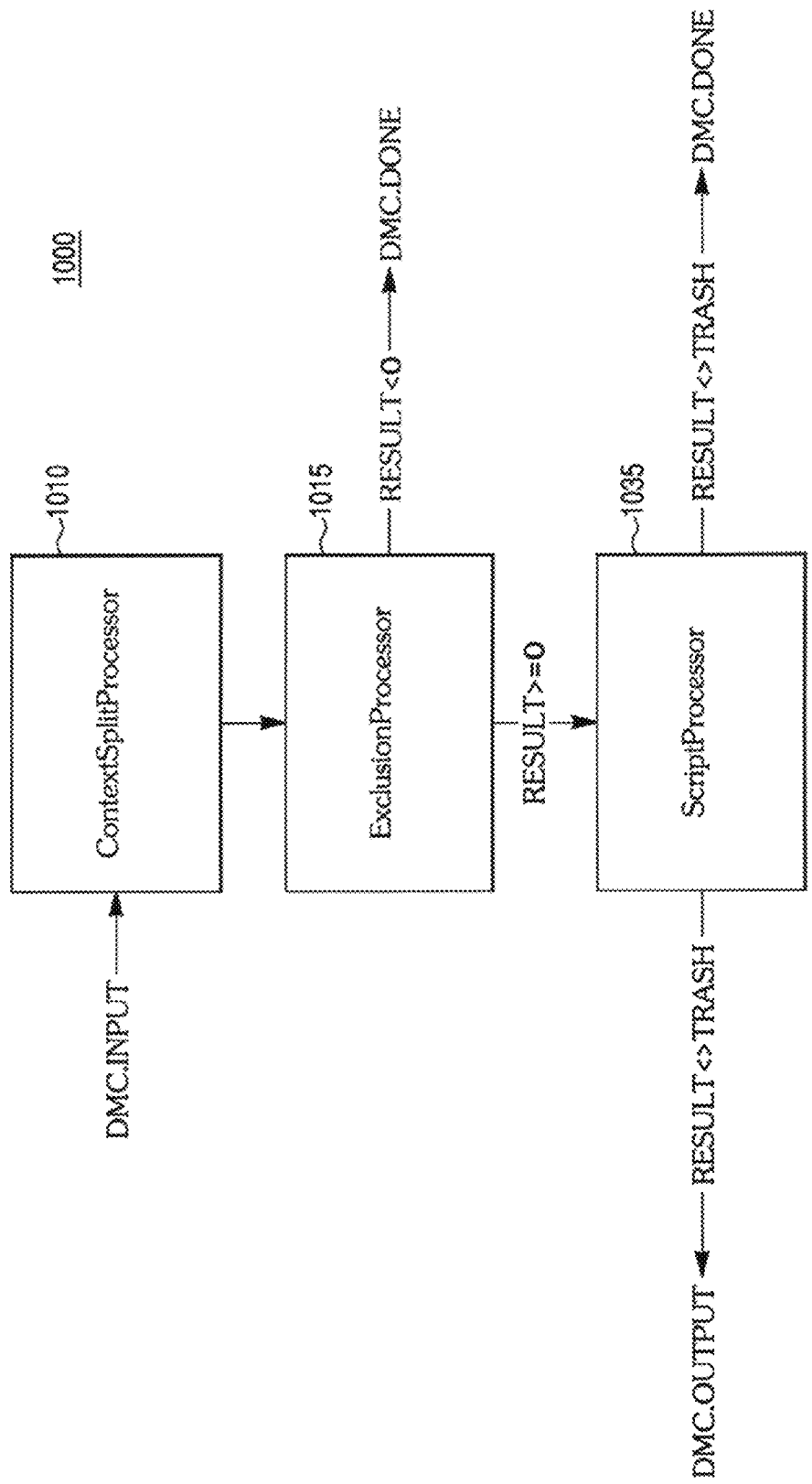
FIG. 10 is a flow chart depicting an internal message flow of a scoring engine consistent with certain disclosed embodiments.

The scoring engine 920 application may be seated in a Java framework application with an internal message flow 1000 such as the message flow depicted in FIG. 10. FIG. 10 illustrates a number of elements that can participate in the Scoring Engine 920 data flow, as further described below.

5.2.1.1 ContextSplitProcessor

The ContextSplitProcessor 1010 is generally responsible for ensuring that output messages contain only a single context. A message can contain multiple contexts if the message content is applicable to more than one report. The ScriptProcessor 1035→1115 cannot usually score multiple reports within a single message since output properties could collide. Therefore, in order to avoid these collisions, the ContextSplitProcessor 1010 may clone the input message for each context.

Content objects may be shared in order to avoid expensive duplication. Scripts (such as script 1230), however, can modify the content property of a message and this behavior should usually not be shared.

5.2.1.2 ExclusionsProcessor

The ExclusionProcessor 1015→1610 is often responsible for processing report specific url, domain, and ip address exclude lists configured in the CIC 950. The exclusions can be loaded from a ConfigurationManager and cached internally for performance. Some possible input properties, output properties, and configuration options are, for example, Context, which is an input property generally used to contain one or more reports to load exclusions from. uri, which is an input property generally used to test against exclusions. Ipaddress, which, if present, usually representsthe ip address is an input property generally converted to text and tested against the exclusions list. Result is an output property that can take the form of a variable. In some embodiments, a RESULT_SUCCESS=Url may not be excluded, while a RESULT_FAIL=Url might be excluded. exclusionProperties is a configuration option of Type "Collection<String>", which usually represents a list of properties in a message to test against the exclusion list. exclusionListFactory is a configuration option of Type "Factory<ExclusionsList>", and is often employed as a factory object used to create objects of type ExclusionList from the Context of the incoming message.

5.2.1.3 ScriptProcessor

Figure 11:
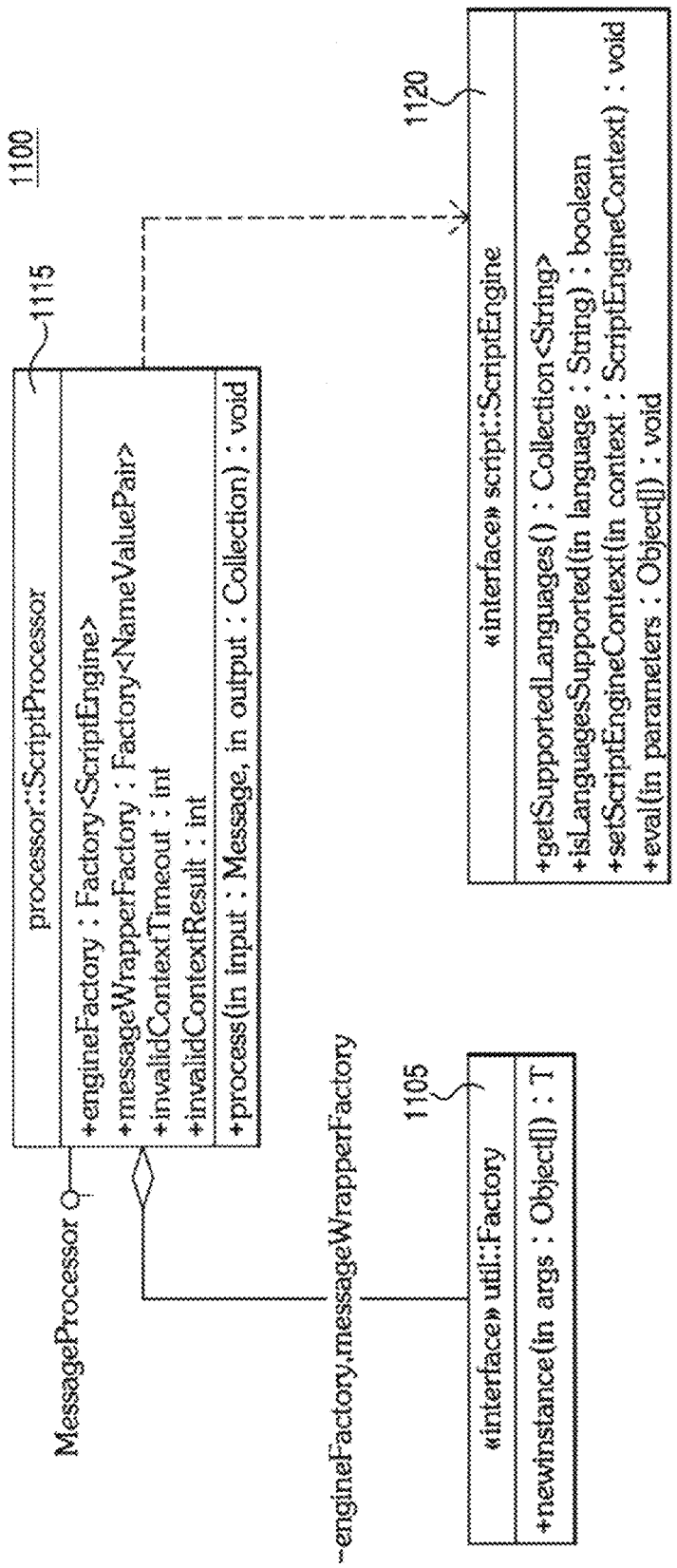
FIG. 11 is a high-level class model for a ScriptProcessor object, and illustrates the ScriptProcessor object's relationship to the Factory and ScriptEngine objects consistent with certain disclosed embodiments.

FIG. 10 illustrates an instance of the ScriptProcessor 1035→1115 (shown in greater technical detail as ScriptProcessor 1115 in FIG. 11), which is usually responsible for scoring the scripts (such as script 1230), collections, and word expression. The Figure illustrates a configuration in which the ContextSplitProcessor 1010 receives data from a data source DMC.INPUT, which is subsequently relayed to the ExclusionProcessor 1015→1610. A result of the ExclusionProcessor 1015→1610 determines whether the process is terminated ((Result<0), or is passed to the ScriptProcessor 1035→1115. If the information is passed to the ScriptProcessor 1035→1115, the ScriptProcessor 1035→1115 makes a decision as to whether the result is trash (causing the process to end), or if it is not trash, causing the processed data to be output as DMC.OUTPUT.

The high level class model for the ScriptProcessor 1035→1115 is depicted in subsystem 1000 in FIG. 10. A lower-level, more detailed depiction of the ScriptProcessor 1035 may be seen in FIG. 11, and is denoted as ScriptProcessor 1115. The illustration in FIG. 11 shows that the ScriptProcessor 1115 owns an object Factory 1105 which creates a ScriptEngine 1120 object given a framework "Context". The processor then calls the eval( . . . ) method on the ScriptEngine 1120 object to execute the scripts (such as script 1230).

The ScriptProcessor 1035→1115 is itself relatively simple and need not address certain functions such as caching or processing scripts (such as script 1230, which could be a JavaScript, WordExpression, or any other script), and may or may not play a role in functions such as script loading. Some or all of this functionality may be delegated to engine and/or engine factory implementations.

The ScriptProcessor 1035→1115 also has various input properties, output properties, and configuration options. Most properties of the message are potentially used by this processor in the following ways:

1. The Word expression engine is configurable to score properties specified in configuration.
2. Scripts (such as script 1230) can access any message property via Page.getProperty( . . . )

Some of these properties could include input property objects such as context, which could be a property that typically contains one or more reports to load scripts (such as script 1230) from; or content, which may be an input property that typically contains url content to execute scripts (such as script 1230) against. Another object could be collection/Word Expression Script Name, which can be output properties that represent one or more values computed by a collection or word expression.

Other properties could be output properties of the ScriptProcessor, such as DownloadDate, that could be an output property representing a date property converted to a DB2 formatted timestamp or current timestamp if the date property is null. The value of this property may be populated by a default script executed for a given report. SourceStage might be an output property representing a framework stage that sends a message to the scoring engine 920. The value of this property could be populated by a default script executed for a given report. StageHistory could be an output property representing a stage history collection size. If a stage history collection size>1, this field may contain a comma delimited list of stages a message has been processed by. The value of this property could also be populated by a default script executed for a given report. topic_hits might be an output property representing a list of one or more topics, and further might be represented by a comma delimited list for one or more reports having values>0. This property could often be populated by a standard script, such as topic_and_subtopic.

subtopic_hits may also be an output property of the script processor, and could represent a list of one or more subtopics, often comma delimited, for one or more reports having values>0. This property is often populated by the previously mentioned script: topic_and_subtopic. topic_word_hits could also be an output property, and may represent a list of one or more words, often comma delimited, within the topic expressions that were found in the content. The value of this property is usually populated by the previously mentioned script topic_and_subtopic. In addition, subtopic_word_hits could be an output property representing a list of one or more words, often comma delimited, within the topic expressions that were found in the content. The value of this property is often populated by a standard script: topic_and_subtopic. Title is generally an output property representing text found between the <TITLE> tag if the content is HTML. The value of this property is often populated by WordExpressionScriptEngine. sourcetype can be an output property representing an integer value for the source of a message. This value is often populated by the standard script: sourcetype. sourcetypetext might be an output property representing a text friendly version for the source of the message. This value is often populated by the standard script: sourcetype.

Other output properties can include any or all of the following objects or fields, such as subject, which may be an output property populated by a downloader. If not present, the page Title can be used to populate this field. The Title copy will often be performed by the standard script sourcetype. author could also be an output property populated by a downloader. Typically, no manipulation is performed by code or script on this object. source may be another output property populated by a downloader. Similarly to author, typically, no manipulation is performed by code or script. Other such output properties could include ErrorString, which may be an output property representing an error message containing scoring details. The value of this property could be populated by scripts (such as script 1230). Specifically, scripts (such as script 1230) can set any property during script execution via Page.setProperty( . . . ) calls. By convention, a script typically sets a page property where the name of the property is the name of the script.

Other properties include configuration option properties. For example, one such property could be a messageWrapperFactory configuration option. This option could also have a type, such as "com."company_name".util.Factory" (i.e., com.cyveillance.util.Factory), and may normally be an object responsible for creating a Page object scored in one or more scripts (such as script 1230) from a message object received by one or more processors. Another configuration object could be engineFactory, which may be a configuration option of type "com."company_name".util.Factory" (i.e., com.cyveillance.util.Factory), and might normally be an object responsible for creating ScriptEngine 1120 objects. Further objects could include items such as invalidContextTimeout, which could be a configuration option of type "long". If there is an error in a script or word expression that prevents successful processing of data for a given context, the context could be marked as invalid and subsequent messages could be given a RESULT_FAIL error message as a result of the invalidContextTimeout object. The value of this object usually determines how long to wait before attempt to reload the context to see if the issue is fixed.

5.2.2 Class Model

Both the ScriptProcessor 1035 and ExclusionsProcessor 1015 can utilize an underlying framework independent API. Each of the models will now be described individually. Some embodiments describe classes and interfaces that have been mapped out and documented in detail. Many of the classes were implemented during prototype development and can be subject to change.

Below is a quick reference of the UML notation used in some of the class schematics depicted in the drawings.

A ─────▷ B Generalization: class A extends B

A ─ ─ ─ ─▷ B Realization: class A implements B

A ◆─────── B Association (composite): class A {private B b;} lifetime of instance of B same as A A ◇─────── B Association (shared): class A {private B b;} instate of B could be owned by other objects A ─ ─ ─ ─> B Relationship: class A {void method1( ) {B b=new B( ); b.run( )}

5.2.2.1 ScriptEngine

Figure 12:
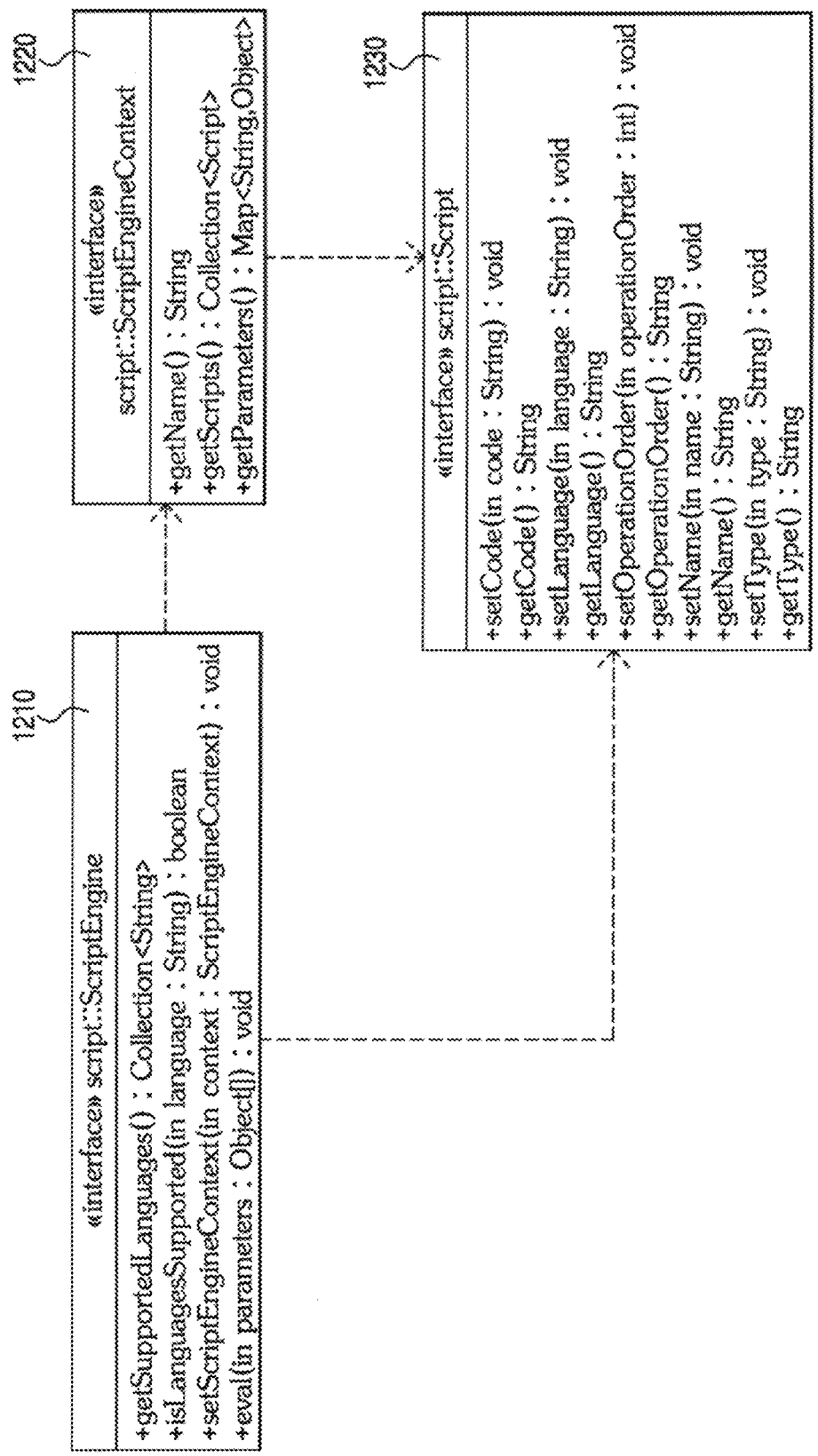
FIG. 12 is a schematic illustrating the relationships between the scripting object model elements ScriptEngine, ScriptEngineContext and Script.

FIG. 12 depicts some elements of the scripting object model, which may include one or more of the following three interfaces:

ScriptEngine 1120→1210→1380 is a class that usually executes scripts (such as script 1230) provided by a ScriptEngineContext 1220 (See FIG. 12). ScriptEngineContext 1220 is a class that usually consists of a collection of scripts (such as script 1230) and global variables to be executed by a ScriptEngine 1120→1210→1380. Script 1230 is a class that typically is representative of an individual script to be stored within a ScriptEngineContext 1220 and executed by a ScriptEngine 1120→1210→1380, although may also represent the storage of more than one script.

Figure 13:
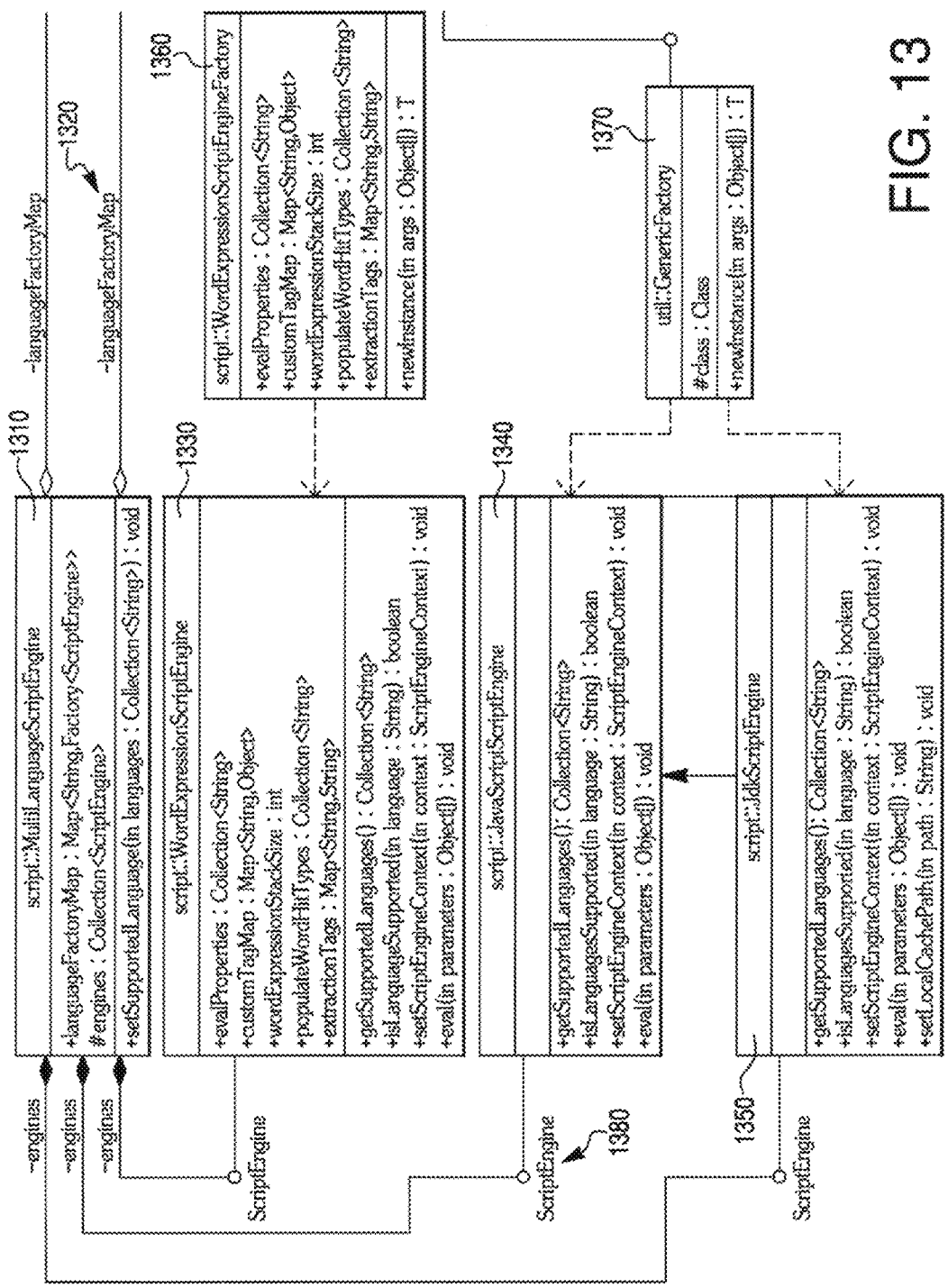
FIG. 13 is a schematic illustrating the relationships between a MultiLanguageScriptEngine object and various differing language specific engine objects consistent with certain disclosed embodiments.

FIG. 13 depicts an embodiment in which some more versatile objects have been used, such as a MultiLanguageScriptEngine 1310, which can be a ScriptEngine implementation such as the ScriptEngine 1120→1210→1380 implementation used to manage a ScriptEngineContext 1220 that contains scripts (such as script 1230) in more than one language. This class groups scripts (such as script 1230) into single language collections and then delegates the execution of a given script to a ScriptEngine 1380 implementation for that language. The relationship between MultiLanguageScriptEngine 1310 and the language specific engines is described in detail FIG. 13. In particular, FIG. 13 depicts objects such as a WordExpressionScriptEngine 1330, JavaScriptScriptEngine 1340, JdkScriptEngine 1350, WordExpressionScriptFactory 1360, and Generic Factory 1370.

One complication in the implementation of a MultiLanguageScriptEngine 1310 has to do with creating and initializing the language specific ScriptEngine 1120→1210→1380 implementations. ScriptEngine 1120→1210→1380 implementations may require substantial configuration. The languageFactoryMap 1320 in MultiLanguageScriptEngine 1310 is used to control the initialization of underlying ScriptEngine 1120→1210→1380 implementations without requiring MultiLanguageScriptEngine 1310 to know anything about the particular implementation.

Creation of MultiLanguageScriptEngine 1310 objects is usually handled by a MultiLanguageScriptEngine 1310 "Factory", as depicted in FIG. 13. The MultiLanguageScriptEngine 1310 Factory is a subclass of the more generic ScriptEngineFactory 1430 depicted in greater detail in FIG. 14. The ScriptEngineFactory 1430 performs the following functionality when newInstance(Context) is called:

1. Create ScriptEngineContext 1220 object using the Context.

2. Create ScriptEngine 1120→1210→1380 object.

3. Initialize ScriptEngine 1120→1210→1380 object using ScriptEngineContext 1220.

Figure 14:
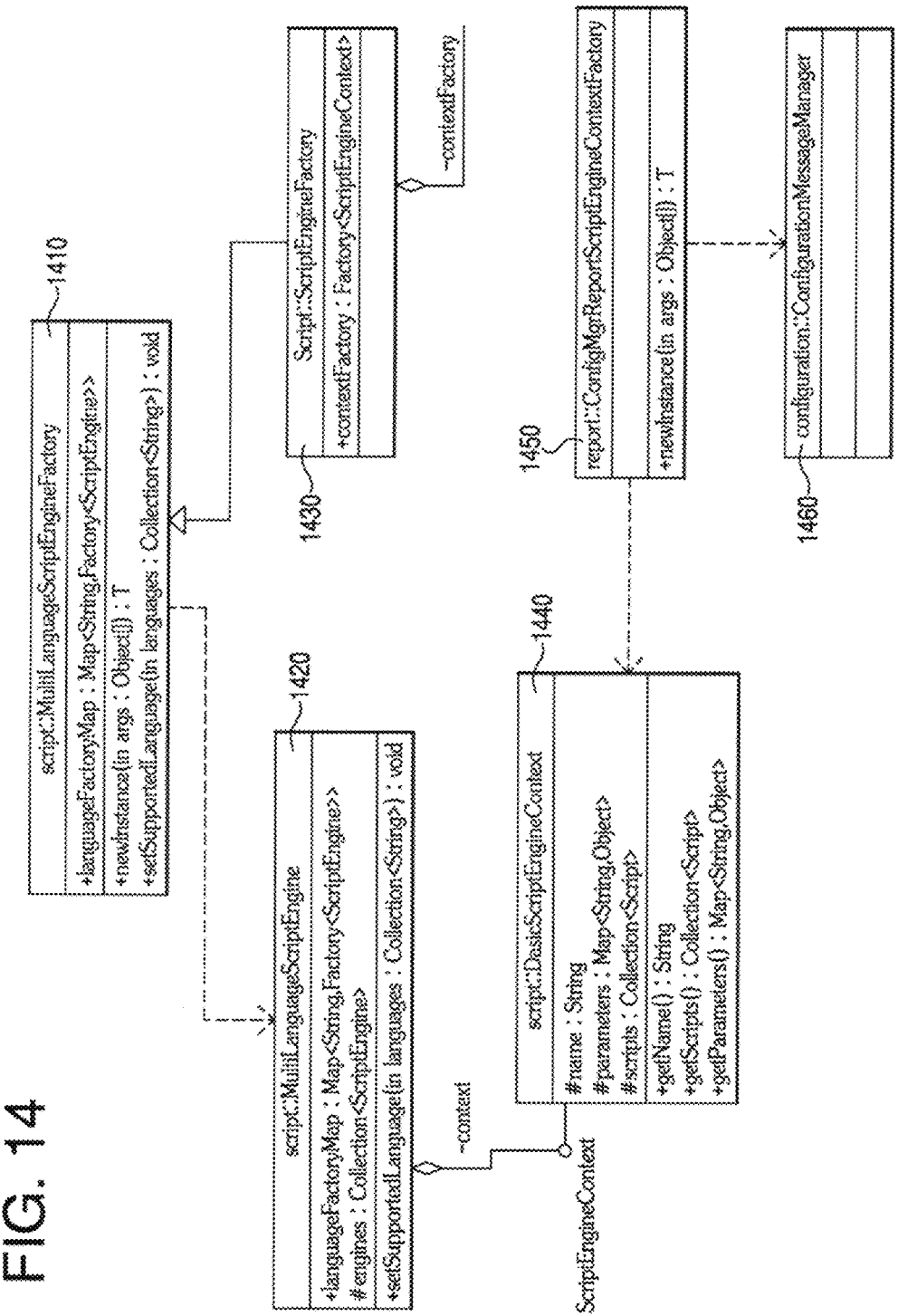
FIG. 14 is a schematic illustrating the relationships between a MultiLanguageScriptEngineFactory object and various differing object classes consistent with certain disclosed embodiments.

ScriptEngineContext 1220 creation is usually handled by another Factory object. The purpose of this Factory object is to externalize the method used to load the context. For example, scripts (such as script 1230) could be loaded directly from the CIC database 940 or loaded from a ConfigurationMessageCollection 1520 (see FIG. 15). In either case, this is entirely independent of engine initialization, which is the primary responsibility of a ScriptEngineFactory 1430. The relationship between these classes is shown in FIG. 14. FIG. 14 further illustrates the relationships between the MultiLanguageScriptEngineFactory 1410, the ScriptLanguageFactory 1430, the MultiLanguageScriptEngine 1420, the BasicScriptEngineContext 1440, the ConfigMgrReportScriptEngine 1450, and the ConfigurationMessageManager 1460.

Figure 15:
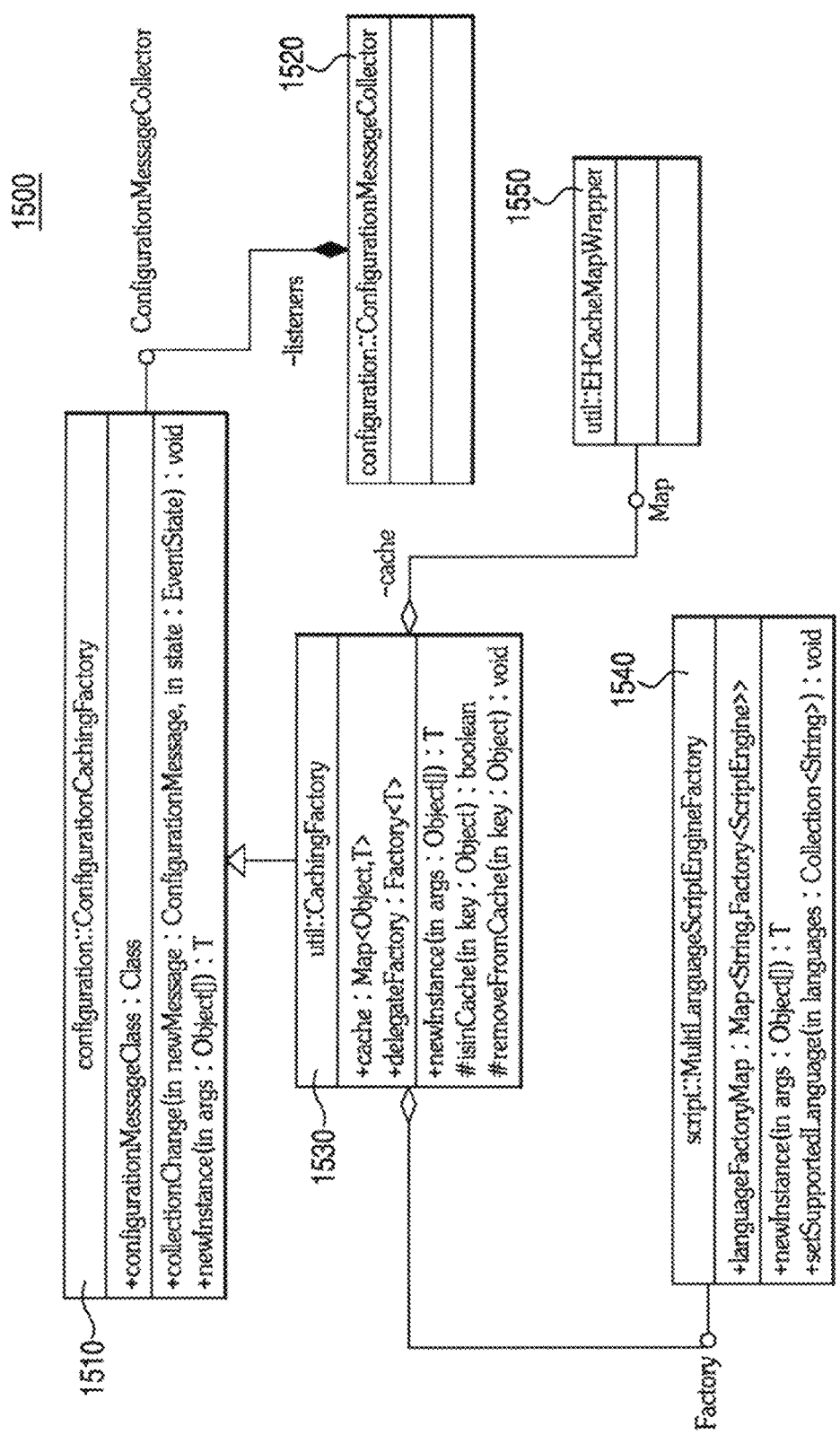
FIG. 15 is a schematic illustrating the relationships between a ConfigurationCachingFactory object and various differing object classes consistent with certain disclosed embodiments.

Another set of classes are responsible for implementing the caching behavior. Creation and initialization of a MultiLanguageScriptEngine 1310 can be expensive and should usually not be performed on a per message basis. FIG. 15 element 1500 illustrates various caching objects and their relationships. In particular, FIG. 15 illustrates the ConfigurationCachingFactory 1510, the ConfigurationMessageCollectionListener 1520, the CachingFactory 1530, the MultiLanguageScriptEngineFactory 1540, and the EHCacheMapWrapper 1550.

The CachingFactory 1530 is the primary class in this heirarchy. This class maintains a Map of objects and a delegating factory. When newInstance(key) is called on a CachingFactory 1530 it first looks in the cache using the key and if not present will call the delegating factory. For the scoring engine 920 the key is the framework message context. The Map implementation of the cache is externalized in order to provide maximum configurability without having to modify CachingFactory 1530.

Since ConfigurationMessageManager 1680 (See FIG. 16) is being used to load the ScriptEngineContext 1220, a special subclass of CachingFactory 1530 is needed to clear the cache when configuration information changes. This subclass implements ConfigurationMessageCollectionListener which is used to remove cached engines when the configuration for that context is modified.

5.2.2.2 ExclusionProcessor

Figure 16:
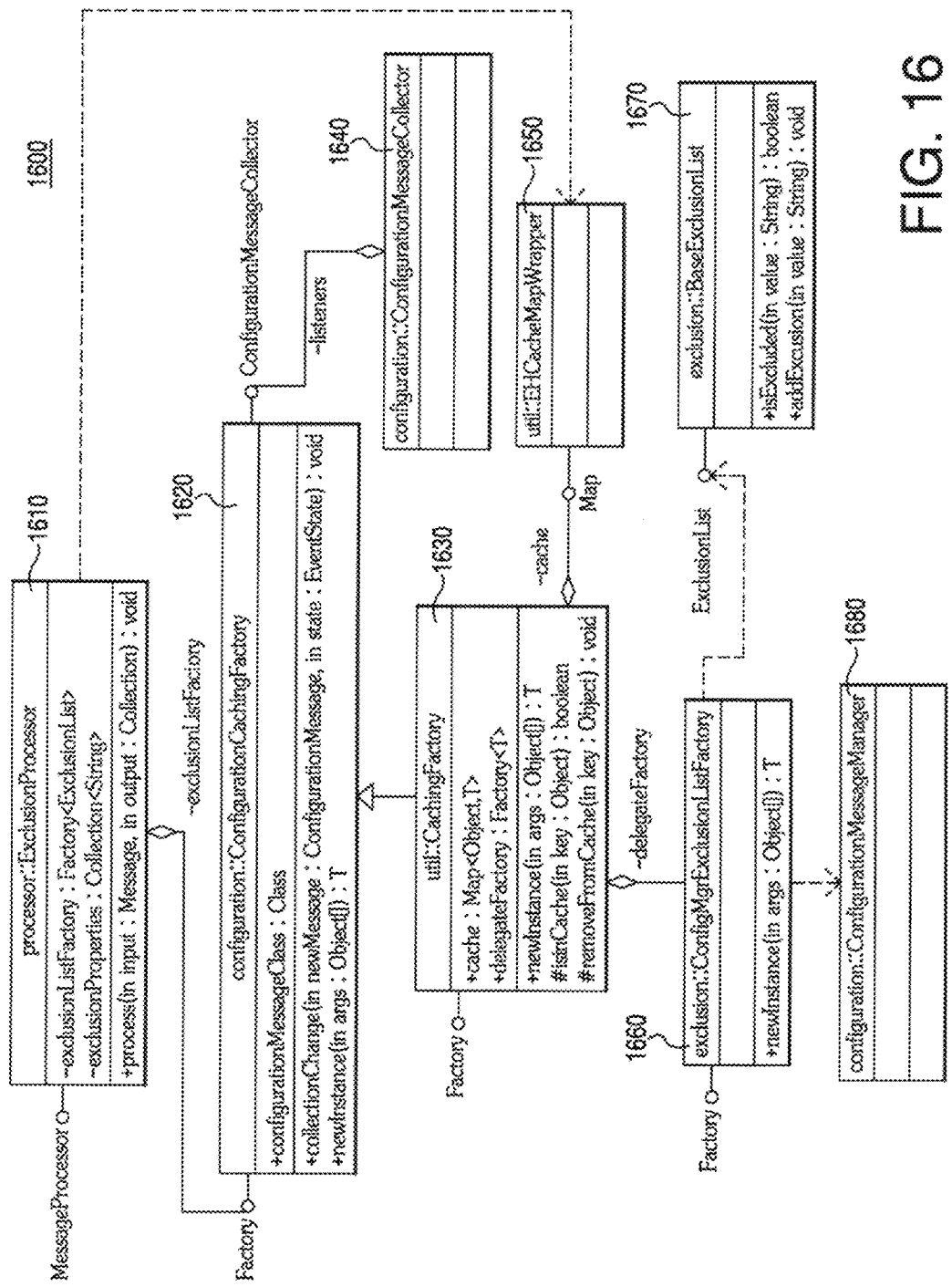
FIG. 16 is a schematic illustrating the relationships between a MultiLanguageScriptEngineFactory object and various differing object classes consistent with certain disclosed embodiments.

FIG. 16, element 1600 depicts the ExclusionProcessor 1015→1610 class, and its relationship to various entities in accordance with certain embodiments. For example, FIG. 16 depicts certain possible relationships between the ExclusionProcessor 1015→1610, ConfigurationCachingFactory 1620, CachingFactory 1630, ConfigurationMessageCollection 1520→1640, EHCacheMapWrapper 1650, ConfigMgExclusionListFactory 1660, BaseEnclusionList 1670, and ConfigurationMessageManager 1680. The model for classes used by the ExclusionProcessor 1015→1610 is described in the class schematic of FIG. 16. The caching and factory model is very similar to the one used by the ScriptProcessor 1035. Some of the classes used by the ExclusionProcessor 1015→1610 class and their descriptions as identified in FIG. 16 are provided below:

ExclusionProcessor 1015→1610 is the primary class that serves as a framework message processor that grabs an ExclusionList implementation via the exclusionListFactory. Exclusion lists are framework context specific. Specifically, the ExclusionList is a class that serves as an interface used to test an exclusion. The BaseExclusionList 1670 is a class that serves as a simple HashMap implementation of the ExclusionList interface. The ConfigMgrExclusionListFactory 1660 is a class that serves as a factory implementation that takes the framework context as input, queries the ConfigurationMessageManager 1680 for exclusion messages for that context, and returns a loaded BaseExclusionList 1670 object for that context.

5.2.2.3 ContextSplitProcessor

No class schematic is provided since there are currently no supporting classes. At present, this functionality is implemented within the message processor.

5.2.2.4 ConfigurationManager

Figure 17:
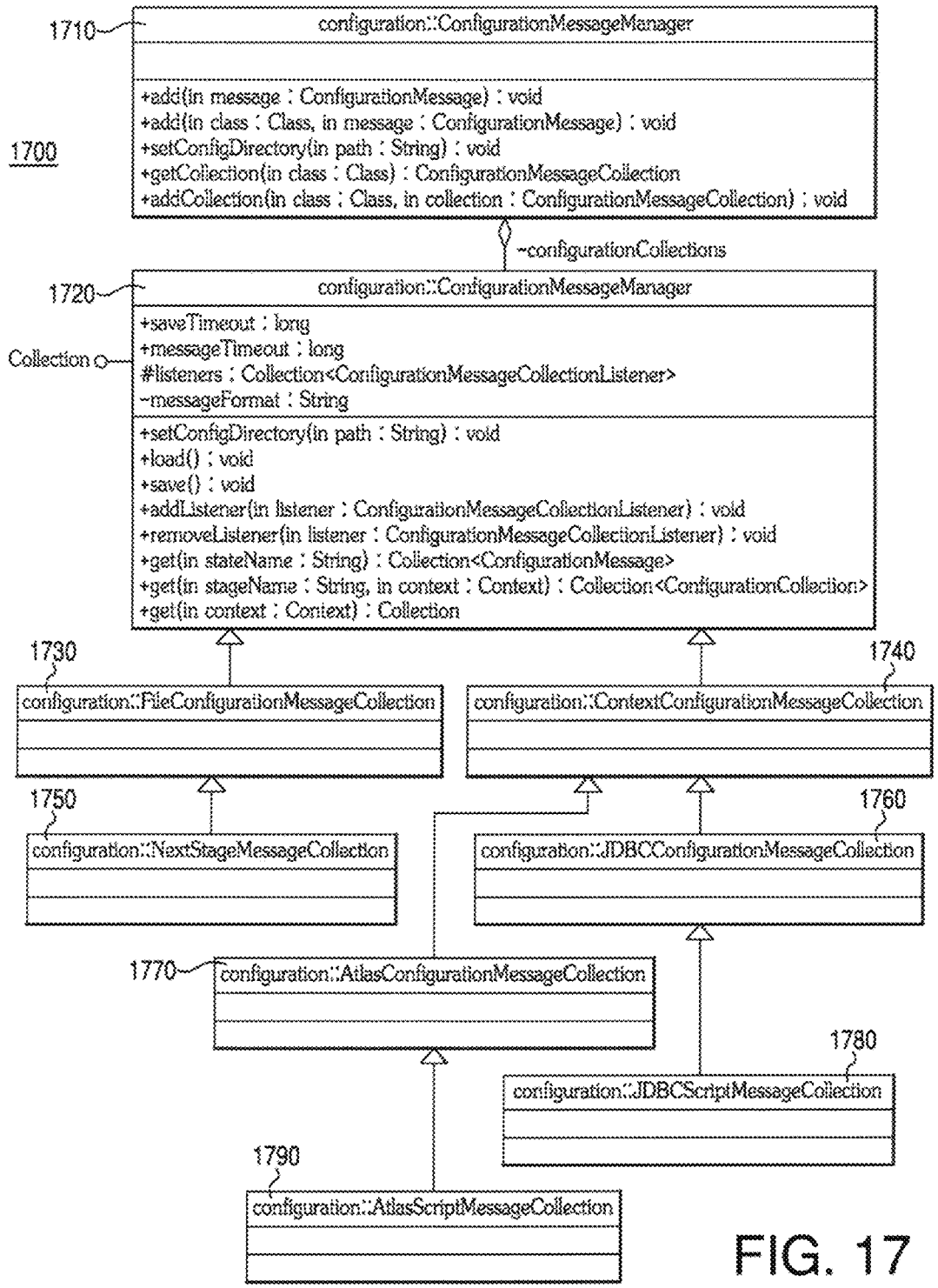
FIG. 17 is a schematic illustrating the relationships between a ConfigurationMessageManager object and various differing object classes consistent with certain disclosed embodiments.

FIG. 17 depicts the ConfigurationManager Class 1700. In FIG. 17, the various relationships between the ConfigurationMessageManager 1710, ConfigurationMessageCollection 1720, FileConfigurationMessageCollection 1730, ContextConfigurationMessageCollection 1740, NextStageMessageCollection 1750, JDBCConfigurationMessageCollection 1760, AtlasConfigurationMessageCollection 1770, JDBCScriptMessageCollection 1780, and AtlasScriptMessageCollection 1790 classes.

The current framework applications receive report specific configuration via a scheduled message push from the task engine. The task engine supports loading and serialization of word expressions and next stage messages to any backend application. In order to use the same method for the Scoring engine 920 the following support is currently under modification. For example, a SendScoreMessages object may be modified to support scripts (such as script 1230) in addition to word expressions. Similarly, SendScoreMessages may either be modified, replaced, or supplemented with another task capable of converting collections to word expressions, and ConfigurationMessageCollections 1520→1640 may be augmented to better handle configurations grouped by context. Support for serialization of report and exclusions urls records may be added.

However, even if the above changes were made, the push method itself could still suffer from various deficiencies, because (for one), Word expressions/scripts (such as script 1230) are usually sent individually, and there is no current mechanism for knowing if the configuration for a given context is complete, which could result in scoring errors. Secondly, a race condition may exist between report creation and configuration push that could cause a page to show up at the scoring engine 920 prior to receiving the necessary configuration information for the report.

Both of these issues are overcome, however. Instead of forcing features into a design that was not intended for this purpose, the exemplary embodiments can augment the framework configuration manager to support more advanced querying and allow special purpose subclasses to internally perform more advanced configuration loading. The configuration model would most likely continue to use the same high level objects currently used in the Java framework such as ConfigurationMessageManager 1680 and ConfigurationMessageCollection 1520→1640. The primary changes, however, could include: Addition of new methods in ConfigurationMessageCollection 1520→1640 to support querying of configuration by both stage and context. For example:

In an embodiment, an addition of a new ContextConfigurationMessageCollection subclass that organizes cached configuration message by context could be utilized. The model for the new configuration classes is detailed in FIG. 17. Some of the classes in the model could include, for example, ConfigurationMessageManager 1680, that is a class that usually represents one or more top level singletons containing a set of ConfigurationMessageCollection 1520 objects organized by a ConfigurationMessage class. Other classes could include a ConfigurationMessageCollection 1520→1640 class, that may usually represents a base collection of ConfigurationMessage objects containing high level functionality for change notification, configuration timeout and new methods for querying configuration by context and stage. i.e., get all ScoreMessage objects for stage=SCRIPT_ENGINE and context=ENV,CLIENT,REPORT. Further, a FileConfigurationMessageCollection 1730 could be included, which may be a class that is a subclass of ConfigurationMessageCollection 1520→1640 that can persist the collection to a single message file. This functionality is currently accessible within ConfigurationMessageCollection 1520→1640 and could be refactored out if desirable.

Other subclasses could include objects such as NextStageMessageCollection 1750, which could be a subclass of FileConfigurationMessageCollection 1730 and may contain custom methods for next stage mapping. Further, ContextConfigurationMessageCollection 1740 may be a subclass of ConfigurationMessageCollection 1520→1640 that can persist the collection organized by context. JDBCConfigurationMessageCollection 1760 could be a subclass of ContextConfigurationMessageCollection 1740 that may contain support for connecting to and querying a CIC database 940 via JDBC. AtlasConfigurationMessageCollection 1770 might be a subclass of ContextConfigurationMessageCollection 1740 that could contain support for using Atlas to fetch configuration information. JDBCSriptMessageCollection 1780 might be a subclass of JDBCConfigurationMessageCollection 1760 that directly queries NONCLIENT. FORMULA_UNION and NONCLIENT.SCORE_FORMULA_UNION to load word expressions, scripts (such as script 1230), and collections. AtlasScriptMessageCollection 1790 could be a subclass of AtlasConfigurationMessageCollection 1770 that uses Atlas to load word expressions, scripts (such as script 1230), and collections.

5.2.3 Real-Time Configuration Updates

An aspect of the embodiments is to eliminate the need for scoring bounces. Scoring bounces are often required when changes are made to score formulas that are usually picked up immediately. Since the scoring engine 920 caches formulas in memory currently it is usually restarted in order to pickup the new changes. To this end some other embodiments employ various object classes. For example, the ConfigurationCachingFactory implements a ConfigurationMessageCollectionListener object in order to invalidate various portions of cached data upon notification. The rest of work is usually delegated to the configuration system to pickup changes from the CIC database 940 and call the various listeners. The following changes could be made in order to support near real time notification of CIC database 940 configuration changes:

1. A new method could be added to the frameworkService to support context specific invalidation of cached configuration. This method could include objects such as:
   configurationChanged(changeEvent, context, stage, configurationClassName); and/or
   changeEvent: INSERT, UPDATE, DELETE
2. A new scheduler task might be created to issue this web service call for each serviceUrl broadcasting with that stage. Task may have the same parameters as the service call.

One or more stored procedures may be used to create the new task object and queue it in the task engine for execution, such as queue_configuration_update(int event,int report_id, int stage_id,String configurationClass). For example, triggers may be added to call a stored procedure when configuration related tables are modified. A trigger may be fired under the following conditions:

1. INSERT INTO NONCLIENT.STAGE_FORMULA→queue_configuration_update(ADDED, report_id via join, STAGE_ID, "com.cyveillance.framework.message.ScoreMessage")
2. UPDATE NCYF_FORMULA_VERSION or NCYF_ACTIVE_FLG IN NONCLIENT.FORMULA→for each STAGE_ID in NONCLIENT.STAGE_FORMULA where FORMULA ID=NCYF_FORMULA ID queue_configuration_update(CHANGED, NCYF_REPORT_ID, STAGE_ID, "com.cyveillance.framework.message.ScoreMessage")
3. INSERT INTO NONCLIENT.STAGE_COLLECTION→queue_configuration_update(ADDED, report_id via join, STAGE_ID, "com.cyveillance.framework.message.ScoreMessage")
4. UPDATE NCSF_ACTIVE_FLG IN NONCLIENT.SCORE_FORMULA→for each STAGE_ID in NONCLIENT.STAGE_COLLECTION queue_configuration_update(if NCSF_ACTIVE_FLG=1 ADDED else REMOVED, NCSF_REPORT_ID, STAGE_ID, "com.cyveillance.framework.message.ScoreMessage")
5. INSERT INTO NONCLIENT.SCORE_WORD→for each STAGE_ID in NONCLIENT.STAGE_COLLECTION queue_configuration_update(CHANGED, report id via join, STAGE_ID, "com.cyveillance.framework.message.ScoreMessage")
6. UPDATE IN NONCLIENT.SCORE_WORD→for each STAGE_ID in NONCLIENT.STAGE_COLLECTION queue_configuration_update(CHANGED, report id via join, STAGE_ID, "com.cyveillance.framework.message.ScoreMessage")
7. INSERT INTO NONCLIENT.EXCLUSION_URLS→queue_configuration_update(ADDED, NCEU_REPORT_ID, NCEU_STAGE_ID, "com.cyveillance.framework.message.ExclusionMessage")
8. UPDATE NCEU_URL_NAME,NCEU_RPT_ACTIVE_FLG IN NONCLIENT.EXCLUSION_URLS→queue_configuration_update(CHANGED, NCEU_REPORT_ID, NCEU_STAGE_ID, "com.cyveillance.framework.message.ExclusionUrlConfigurationMessage")
9. UPDATE NCRP_RPT_ACTIVE_FLG IN NONCLIENT.REPORT→ if NEW.NCRP_RPT_ACTIVE_FLG<>OLD.NCRP_RPT_ACTIVE_FLG queue_configuration_update(CHANGED, NCRP_REPORT_ID, scoring engine 920 id, "com.cyveillance.framework.message.ReportConfigurationMessage")

5.2.4 Error Handling

There may be various methods, functions, objects, etc. that deal with error handling. A few could include objects or classes related to specific error conditions and some potential corresponding application action(s), such as a script compilation or runtime error. Were this to occur, some possible action(s) could include setting a result code to invalidContextResult and sending an alert email to an Administrator and/or report owner. An alert email would usually contain the following information: Client name, Report name, Complete stack trace and exception messages, and if a line number is reported in the exception text it may be parsed out so that the method name and code snippett can be extracted and added to the email.

Other errors that could occur include Word Expression compilation or runtime errors. In this circumstance, some of the possible Action(s) that may be conducted could include setting a result code to invalidContextResult and sending an alert email to an Administrator and/or a report owner. An alert email may contain information such as the client's name, the report name, a complete stack trace and exception messages, word expression name(s) and code(s), and may also contain a dump of one or more messages being processed when the error occurred.

Yet another error that could occur is an Error loading report configuration in the ScriptProcessor 1035. In this situation, the possible action(s) may include setting a result code to invalidContextResult, and sending an alert email to the Administrator and/or report owner. An alert email might contain information such as the client's name, the report name, a partial or complete stack trace and exception message information, and a dump of some or all of the message being processed when the error occurred. Possible Action(s) in response to this situation could include Set result code to invalidContextResult and send alert to Administrator. An alert email could contain information such as the client(s) name, report name, a complete stack trace and exception message information, and a dump of one or more messages being processed when the error occurred.

Another error which could occur is an Error loading report configuration in ExclusionsProcessor 1015→1610. In this situation, some possible Action(s) include setting a result code to RESULT_ERROR and sending an alert to an Administrator. An alert email could contain information such as a client's name, a report name, a complete stack trace and exception message information, a dump of one or more messages being processed when the error occurred, etc,

6.0 Application Monitoring

Some statistics may also be added the scoring engine 920 for the purpose of monitoring and statistics gathering. For example, a module named scoring.invalidContexts could be created as a usb-module of the ScriptProcessor 1035 that can represent, for example, a semi-colon delimited list of contexts exhibiting some form of processing error, such as "CLIENT1,REPORT1;CLIENT2,REPORT2; . . . etc." These stats in addition to the core defaultWriter module stats may be used for application(s) alerting via Nagios.

6.1 User Interface (UI)

Once the Java Scoring engine 920 components are complete, the CIC 950 can port over the real time scoring and post-production scoring left out of the various (in this case, 3.3-3.5) releases. This involves bringing over functionality from the legacy middle layer. Some of this functionality can include implementation of an execute button on the Edit Algorithm Config→Edit tab. An execute implementation may instantiate a MultiLanuageScriptEngine 1310 object, instantiate a BasicScriptEngineContext 1440 object, loaded with one or more script objects to execute, and then call setScriptEngineContext with this context object, and/or call an eval function on one or more MultiLanguageScriptEngine 1310 objects. The page object(s) are usually passed in as one or more parameters that support a particular domain, such as com.cyveillance.util.NameValuePair. Next, the UI may allow page properties on both the surfing screen and page details screen to display real time scored results when clicked.

For example, using the same procedure as above with one exception: call page.setProperty ("populateWordCounts",1) prior to calling eval. the word expression engine can use this property to determine whether or not to write out the detailed list of which words hit. If the collection name is property_a then the property property_a_word_counts may be populated with the word count information.

Word count information is usually in the form of one or more Java objects. Both scripts (such as script 1230) and collections may be real-time scorable.

Input validation may be conducted anytime a script is added or updated in Edit Algorithm Config, and may be executed in real time prior to allowing the save operation. This may involve creating a dummy page with properties and content in order to catch both compilation and most runtime errors. A Script Editor can also be used to change a helper UI by inserting objects such as Page.getProperty("?") and Page.setProperty("?","?") instead of Page("?").

6.1.1 Testing Screens UI's

Beyond porting over the existing functionality to the new middle layer, some example set of testing screens are provided to exemplify some embodiments that could help a user to help test and/or debug the scoring function before the prototype system goes into a production system. In FIG. 18, an example testing screen 1800 is depicted in accordance with certain embodiments. In FIG. 18, a basic "Scoring Testing" box is depicted containing radio buttons "test single page" 1810 and "Run test pages (6 test pages available)" 1820. A "Next" button is also provided to advance a user to the following screen depending on which radio button is chosen.

Figure 19:
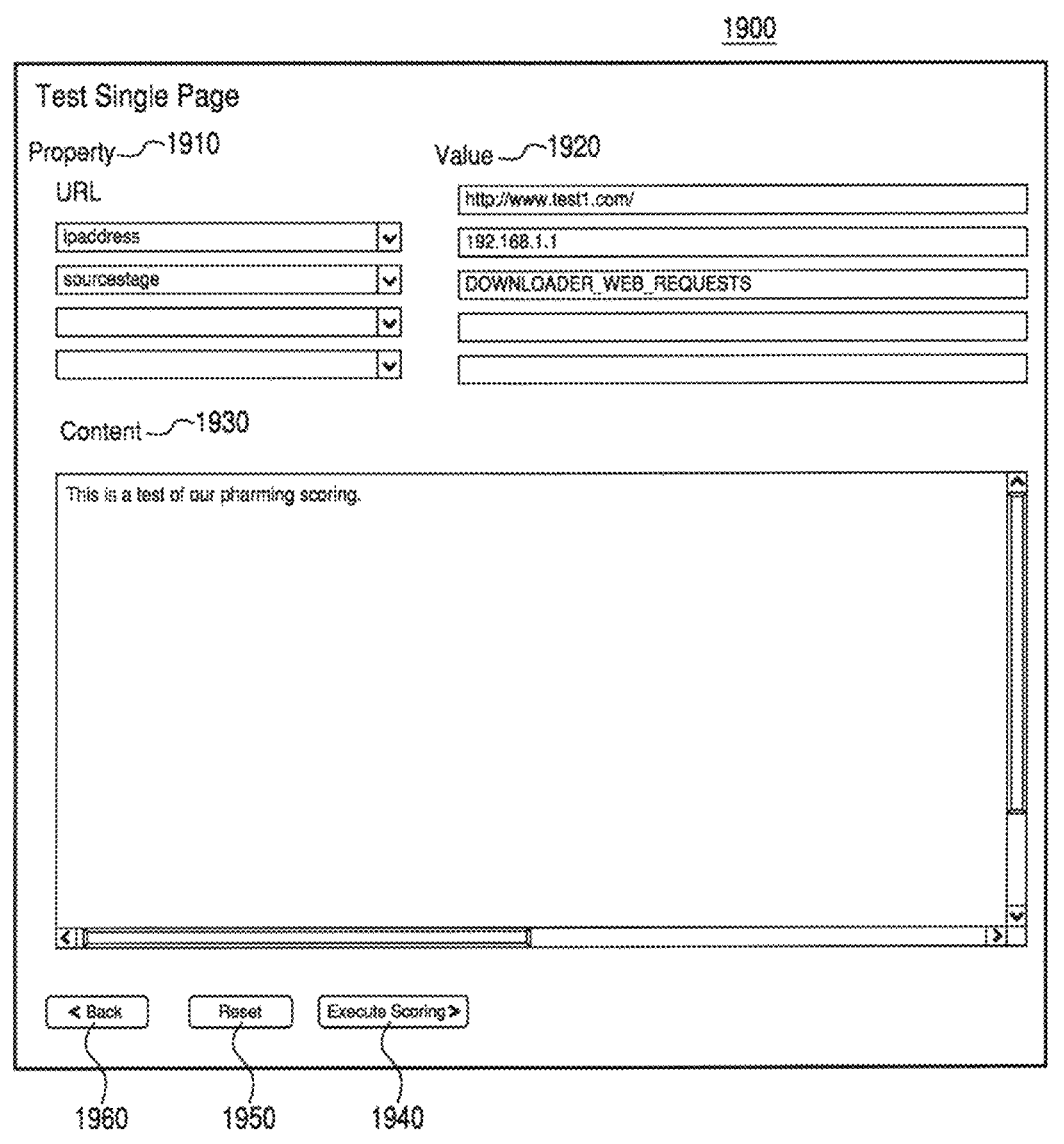

If the user selects "Test single page", the screen 1900 illustrated in FIG. 19 may be displayed. Screen 1900 is only an example of any number of various UI's that might represent the results of a single page testing function, and in an embodiment depicts a Property field 1910, a Value field 1920, a Content field 1930, a "Back" button 1960, a "Reset" button 1950, and a submit button (labeled "Execute Scoring>") 1940. The UI screen 1900 allows the user to enter a page and the page's properties in order to perform a single page test.

If the "Back" button 1960 is selected, the user is usually directed back to the start screen 1800 (FIG. 18). If the "Reset" button 1950 is selected the form 1900 is cleared. If the "Execute Scoring" button 1940 is selected, real time scoring is executed and a "Results" screen 2000 (See FIG. 20) is displayed.

6.1.2 Results Screen

FIG. 20 illustrates a sample "Results" screen 2000 in accordance with certain embodiments of the disclosure, although the informational content could be displayed in any other number of ways. The "Results" screen 2000 might typically display a "Properties" field 2010, a "Content" field 2020, and could also display various buttons such as a "Back" button 2030, a "Save As Test Case" button 2040, and/or a "Done" button 2050.

The results screen can both echo the user input and also show the testing results of the scripts (such as script 1230) and collections. The results list may be very similar to a Page Detail screen. This means that the property names can be clicked to display features such as word count results. The "Back" button 2030 can be selected to change the testing input values. The "Done" button 2050 may return the UI to the start screen (FIG. 18). The "Save As Test Case" button 2040 may perform the following action(s) (the input page may also be copied prior to executing real time scoring):

1. Save input page in SCORING_TESTS_INPUT stage. Content may be saved as a category to prevent constraint violation.
2. Save scored page in SCORING_TESTS stage. Content may be saved as a category to prevent constraint violation.

Prior to allowing a page to be saved an ok/cancel dialog may be displayed with certain text, such as: "Press OK only if you are sure the scoring result(s) are accurate. The current property value may be used as expected results in future test runs."

In some embodiments, if the user selects "Run test pages" (option 2 from FIG. 18) from the start page, then a page similar to FIG. 21 may be displayed. FIG. 21 depicts the results of multiply scored test pages (www.test1.com-www.test5.com) and provides an indication of a pass/fail result of the page scoring. In FIG. 21, the multi-page scoring report 2100 is provided. Typically, the multi-page scoring report 2100 can include the test result elements 2110, and test result details 2120. This page may also load up one or more of the pages in the SCORING_TESTS_INPUT stage, and may additionally cue further processes to run real time scoring against each, any or all of them. The scored pages may then be compared with the values in SCORING_TESTS. As previously stated, an embodiment of the results page is shown in FIGS. 20 and 21.

6.1.3 Script Conversion

Since the current scoring scripts are not compatible with a Java version of the scoring engine 920, a utility may be written to convert the scoring scripts (such as script 1230) at application deployment time. The script conversion code and algorithm(s) have already been written during the course of prototype development. The job of the utility may be to sweep through the CIC database 940 and create a converted script version for any or all JavaScript formula in the system. The utility may be a Java command line application supporting command line usage such as illustrated in the following example:

```
java com.cyveillance.script.ScriptConvertor (convert|rollback) [--migrated-only] [--log-
directory=?] [--db-url=?] [--db-user=?] [--db-pass=?] [--client] [--report] [--replace-directory=?]
```

Commands
convert: Create new script version and update current script version to newly created version.
rollback: Parse log files and change script version back to the pre-converted version.
Options

```
    --migrated-only: Only converts scripts for reports in UNIFIED.MIGRATED_REPORT
(default: convert all reports)
        --log-direct  : Location of log files. (default: ${home.dir}/convertor
        --db-url      : JDBC connection string to CIC database 940. (default:
jdbc:db2://RS6KTEST:60000/DEV30)
        --db-user     : CIC database 940 user name (default: w_ipis)
        --db-pass     : CIC database 940 password (default: none)
        --client      : Name of client to convert.
        --report      : Name of report to convert. Client usually also be present.
        --replace-dir : Directory containing scripts to replace instead of convert. Name of file may
be the name of script to replace.
```

The algorithm for the script conversion utility could be executed in a sequence resembling the following instruction set:

```
load all rows in NONCLIENT.REPORT
for each report
    load all rows in NONCLIENT.FORMULA
    if not migrated-only load all rows in NONCLIENT.SYSTEMS_FORMULAS
    for each script
        load active script
            * NONCLIENT.FORMULA_VERSIONS for scripts loaded from
NONCLIENT.FORMULA
            * NONCLIENT.SYSTEM_FORMULA_VERSIONS for scripts loaded from
NONCLIENT.SYSTEM_FORMULAS
            if a file exists in replaceDir of same name as script
                replace the script with contents of file of same name
            else
                convert script
            end if
            save new script version in appropriate table
            update NCYF_FORMULA_VERSION_NUM to use new script version
            log all actions in the event of rollback
        next script
    next report
```

7. Assumptions

Some assumptions in the previously mentioned approach include the possibility that the performance experienced during prototyping may carry through to production, and that removing the ability of scripts to interact with the CIC database 940 may not impact any production reports. However, there are some accounted for exceptions in at least a few cases. For example, in an online Auction Monitoring, a Dedup script may need to be replaced by page saver 930's url deduping across some of the sampleperiods features. In addition, and relating to CyWatch, a Dedup script may also need to be replaced by page saver 930's url deduping across some of the sampleperiods features. Further, the topic_and_subtopic script could cause the ConfigurationManager to be exposed. This script may be installed at deployment in the parent report of report types that require this functionality.

8. Alternate Embodiments

Some of the alternate embodiments of the scoring module could also include: (1) the Scoring Engine 920 could be linearly scalable across application instances. The anticipated implementation for this desired requirement might be that the Downloader may round robin UrlMessage's to all running instances of scoring engine 920, and the design can be box scalable. (2) a CIC database 940 connection will hopefully not be required by any script. The anticipated implementation for this desired requirement might be that scripts may not have access to a CIC database 940 connection. (3) an application may be able to run normally when the CIC database 940 is down. The anticipated implementation for this desired requirement might be that the ConfigurationManager may cache all loaded scripts to local disk which may allow the scoring engine 920 to run until the configuration messages timeout. The timeout period may also be configurable. (4) UrlMessage processing. The anticipated implementation for this desired requirement might be that all downloaders 910 have already populated the required properties. Framework could automatically handle delivery of the messages. (5) NextStageMessage processing. The anticipated implementation for this desired requirement might be that Framework could automatically handle the delivery and processing of the messages. (6) StageMessage. The anticipated implementation for this desired requirement might be that Framework automatically handles delivery of the messages and processing of the messages. (7) Scripts.

The anticipated implementation for this desired requirement might be that scripts may be loaded by the JDBCScoreMessageCollection object directly from the CIC database 940. (8) Collections may be converted to word expressions by the configuration application used to create the scoring object. The anticipated implementation for this desired requirement might be that the JDBCScoreMessageCollection object may convert all collections to word expressions. (9) Script properties. The anticipated implementation for this desired requirement might be that the JDBCScoreMessageCollection may be responsible for loading these properties from the CIC database 940 and copying them to the ScoreMessage object. (10) Reports. The anticipated implementation for this desired requirement might be that reports may be loaded by a JDBCReportMessageCollection object directly from the CIC database 940. All required properties may be loaded from the CIC database 940 and copied to the ReportMessage object. (11) Exclusions. The anticipated implementation for this desired requirement might be that exclusions may be loaded by a JDBCExclusionsMessageCollection object directly from the CIC database 940. All required properties may be loaded from the CIC database 940 and copied to the ExclusionMessage object. Relatedly, it could be desirable for the exclusions test to not be performed for smtp protocol urls. This desired requirement may be implemented by routing logic. For example, in relationship to smtp, urls may skip the ExclusionsProcessor 1015→1610. (12) Word Expression. The implementation of this property might be that it may be implemented by a WordExpressionScriptEngine object. (13) Collection. The implementation of this property might be that it may be converted to word expressions by JDBCScoreMessageCollection and processed using WordExpressionScriptEngine object. Options could map 1 to 1 with word expression features. (14) Scripts. The implementation of this property might be that it may be implemented by JavaScriptScriptEngine. An underlying interpreter could be provided by Java 1.6 JDK or later. Script conversion may be used to enforce functions such as .getProperty and .setProperty syntax that are not currently being used. Scoring objects such as Domain, etc. could be provided by the UrlMessageWrapperoFactory object. (15) Custom Tags. The implementation of this property might be that custom tags are entirely configurable via the WordExpressionScriptEngine interface. The tag text and associated property may be configurable in the application config file. (16) Alerts. The implementation of this property might be that the alert sections detail this and other application alerts. (17) Real Time Scoring. The implementation of this property might be that script engine 1380 components may be used to port legacy ML real time scoring system over to the new ML. (18) Post-Production Scoring. The implementation of this property might be that script engine 1380 components may be used to port legacy ML post-production scoring system over to the new ML.

System Architecture

Figure 22:
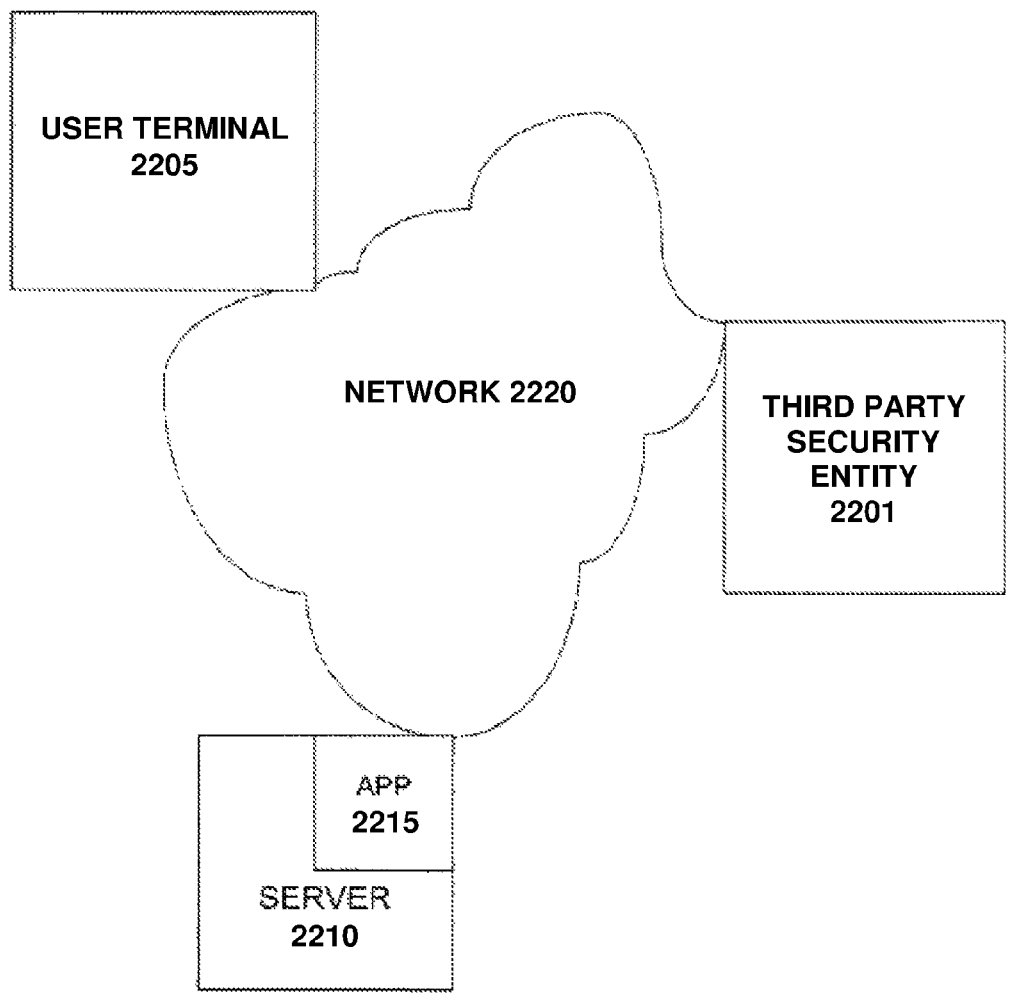
FIG. 22 illustrates a system for misuse detection, according to one embodiment.

FIG. 22 illustrates a system for misuse detection according to one embodiment. A server 2210 and a user terminal 2205 can be coupled to a network 2220. An application 2215 can also be coupled to the network 120, although in some embodiments, the application can also be resident on the server 2210. The system can help monitor misuse or illegitimate use of Web pages or web page content.

Web pages are collections of information typically written in HTML, XHTMl, or other programming languages such that the resulting file is viewable via Web browser applications. Web pages often allow different types of data files, content and connections to be integrated into a single electronic document. This electronic document can be connected via hyperlinks to other Web pages on the domain to create a Web site.

The actual code that makes up a Web page and causes the browser to render it as a viewable document is called the source code. By copying source code, identical copies of Web pages can be made, sometimes in only a matter of seconds. This process may be readily carried out by using a Web browser with a "view source" option to copy at least a portion of the targeted web page, allowing for the efficient creation of a nearly duplicate Web pages. Thus, Web pages in the same domain which share common appearances may be made by using existing pages as templates requiring only slight modifications. Unfortunately, this functionality allows for easy unauthorized duplication of legitimate Web pages for purposes of fraud.

Misuse Detection of Web Pages

Figure 23:
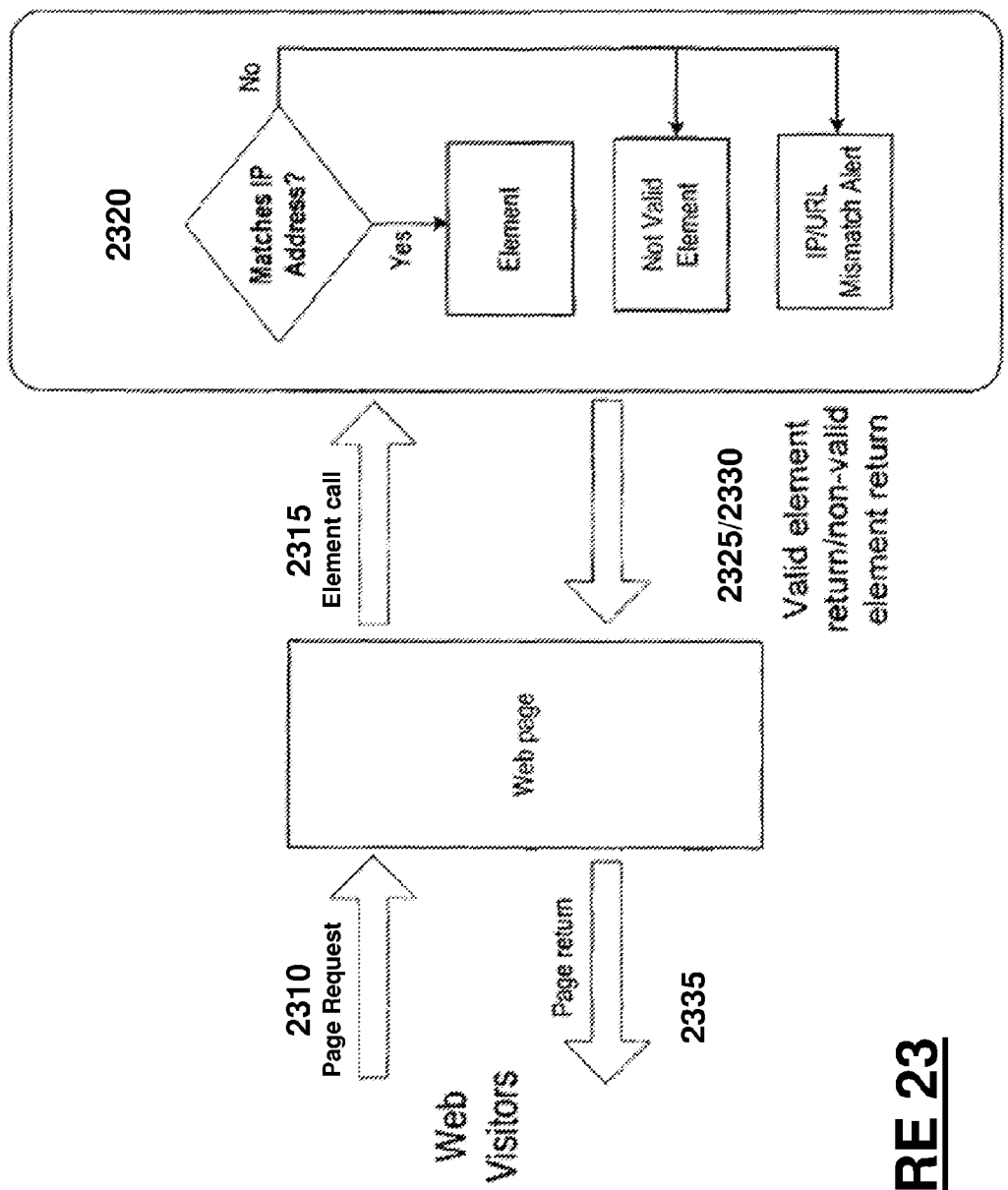
FIGS. 23-25 illustrate methods for misuse detection, according to several embodiments.

FIG. 23 illustrates a method for misuse detection, according to one embodiment. Misuse detection provides a mechanism for the tracking and early detection of Web pages that misuse protected code or content. The specific details of how the technology functions are illustrated and described with respect to FIGS. 23, 24, and 25. Before implementing the functionality of FIGS. 2, 3, and 4, a piece of code (e.g., application 2215) is installed that can communicate with the legitimate web page or trusted third party security entity and can pull the element that can be prominently displayed on a Web page to visitors as a symbol of authenticity (e.g., a logo that says "secure Web page"). The application 2215 can be installed at the Web page at a legitimate company's server 110, or in some other place. When a part of a Web page with the application 2215 installed is copied and used by an unauthorized party, then the unauthorized use can be tracked and reported.

Referring to FIG. 23, in 2310, a user requests a Web page from a Web site, such as www.bank.com. In 2315, the application is triggered (i.e., the element is called/run), and the user's browser tells the Web page www.bank.com to request the element (e.g., security logo). The request can go to the third party security company which can check to see if the use is a fraudulent or inappropriate use of the Web page content (described in more detail below). (Note that in other embodiments, the request could go to another entity.) Because misusers of the Web page content are often copying exactly the Web page content, the misusers will thus copy the security application that been installed, which triggers the request for the element. Each time the Web page is loaded or viewed in a browser, it triggers this request or "call" for the element. In 2315, the receiving server of the call (e.g., the server that owns the legitimate site bank.com) compares the requested Web page's information to the legitimate Web page's information. The compared information can include IP addresses, URLs, and/or domains, or any combination thereof or anything else. Other information can also be compared. If the compared information matches, then in 2325/2330, a valid element (e.g., logo) is returned and displayed on the Web page, which is also returned in 2335. In this case, the user can see that the Web page is secure because of the valid element (e.g., a logo) that is displayed with the Web page. Note that, in one embodiment, the element can be displayed on the browser accessing the Web page, but it will look like the element is actually on the Web page. If the compared information does not match, a not valid element can be returned in 2330 with the Web page in 2335. In this case, the user can see that the Web page is not secure because of a logo or some other element displayed with the Web page that can, in one embodiment, warn the user of potential fraud. Note that, in one embodiment, as indicated in 2320, if there is not a match, then the requesting Web page's URL (e.g., badsite.com), IP address, or other information could be sent to the appropriate party (e.g., the owner of the legitimate Web site and/or a third party security company) for evaluation and analysis.

Methods of Detecting Webpage Misuse

Figure 24:
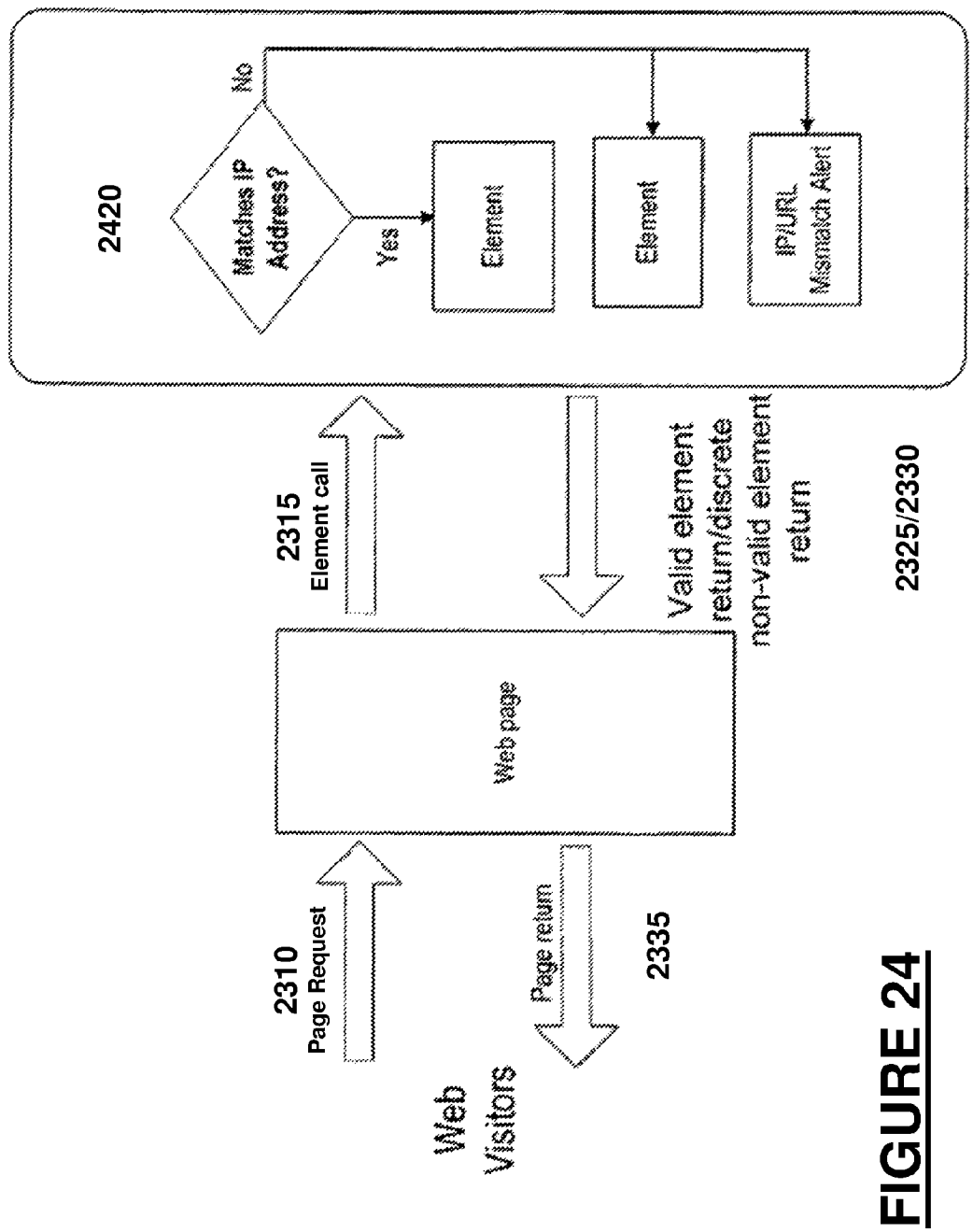

FIG. 24 illustrates a method of misuse detection, according to another embodiment. Note that all of the processes of FIG. 24 are the same as FIG. 23 (e.g., 2310, 2315, 2335, 2325, 2330), except that in 2420, once it is determined that there is not a match, a discrete non-valid element is returned in 2330 instead of the (obvious) non-valid element returned in 2330 of FIG. 2. This can be done so that the determination of whether the Web page is legitimate or not is done in a discrete manner, that is, it is not visible on the Web page and would likely go unnoticed by an unauthorized user misappropriating or stealing the Web page information without a very careful review. This can help, for example, monitor, analyze, and/or catch fraudulent hosts or users of the Web page.

In some embodiments, the discrete non-valid element can be executed on the Web page in a manner that is invisible or substantially unnoticeable to an unauthorized user, such as a pixel in the Web page source code altered in a manner that does not obviously impact the Web page. If the specific part(s) of the Web page that contains the embedded element is copied and used by an unauthorized party, then each call for the element provides an opportunity for alerting unauthorized use. The receiving server of the call in any of these instances could compare the requestor's information to the legitimate information of Web sites authorized to make the request for that element. Regardless of whether there is a match or mismatch, as far as both the viewer of the Web page and the Web page content unauthorized user are aware, nothing appears to be amiss. However, in the case of a mismatch, the requesting Web page's information can be sent to an appropriate party for evaluation and analysis for potential online fraud.

Additional Embodiments of Misuse Detection

Figure 25:
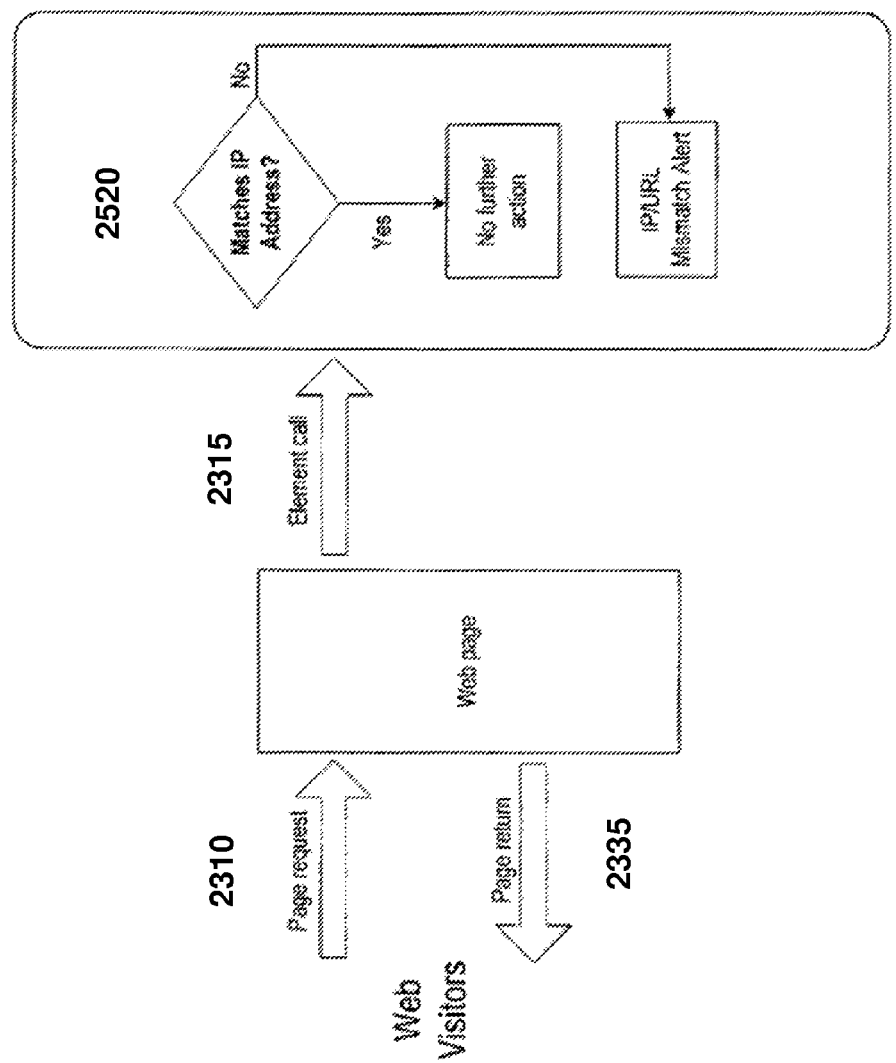

FIG. 25 illustrates a method of misuse detection, according to another embodiment. Note that all of the processes of FIG. 25 are the same as FIGS. 23 and 24 (e.g., 2310, 2315, 2335), except that in 2520, once it is determined that there is or is not a match, no element (either valid or not) is sent back with the Web page.

Note that, in one embodiment, the application 2215 installed at the Web page could include information (e.g., a FLASH program that instigates when the code is run), that can make it non-apparent to phishers or other malicious users, that the code is installed. The element is installed on a Webpage but can be disguised as an unsuspecting part of the Web page. If the specific part(s) of the Webpage that contains the element is copied and used by an unauthorized party, then the element performs a call to the receiving server upon use of the element. The call for a stealth element provides the Web page's information. This information can then be compared to the legitimate Web page's Information. If there is a match, then no further action is required. If there is a mismatch, then the Web page's information address is sent to the appropriate party for evaluation and analysis.

In all of the scenarios outlined in FIGS. 23-25, the common element is the use of an embedded element (e.g., image, file, or other element) that loads every time the Web page of interest is loaded in a browser. In some embodiments, the first time an unauthorized user performs an action, such as checking to see if the fraudulent Web page appears correctly in a browser, an alert can be triggered to notify an appropriate party that something may be amiss. In this manner, in one embodiment, potential early warning of a phishing attack or other online fraud can be given before the attack is launched or legitimate Web page users are ever exposed to the scam.

Email Phishing and Spear Phishing

One of the more common scenarios of online fraud occurs when unauthorized user copies the source code of an organization's Web site for use in a phishing or spear phishing attack by sending emails containing links that lead to malicious web page(s) or web page content. Specifically, a phishing attack is usually perpetrated by sending numerous emails to numerous individuals whose emails have been purchased or stolen, and are targeted relatively randomly. This is why the term "phishing" is used, as it denotes the nature of a perpetrator to cast a "wide net" with an expectation of catching only a few of the "phish" in the sea. Alternatively, "spear phishing" denotes a more individually targeted attack, such as individuals with a common link (such as customers of a bank), or even a specific individual.

A false Web page can be virtually an identical copy of a legitimate Web page, or may simply reproduce portions of the web page such as a logo, or login and/or password boxes. Afterwards, the malicious user can send out emails that appear to be from the legitimate organization and direct the email recipient to the malicious web page content. The malicious emails will often use a variety of false ploys or claims to encourage the user/customer to click on a hyperlink that appears to be the Web address of the legitimate organization, but is in fact a link to another non-legitimate Web site. Note that in some, but not all, embodiments, the visible address shown to the viewer and the actual address to which the link connects do not need to match, which is one of the reasons this sort of fraud is effective at fooling the email recipient.

Malicious Emails: One Example

Figure 26:
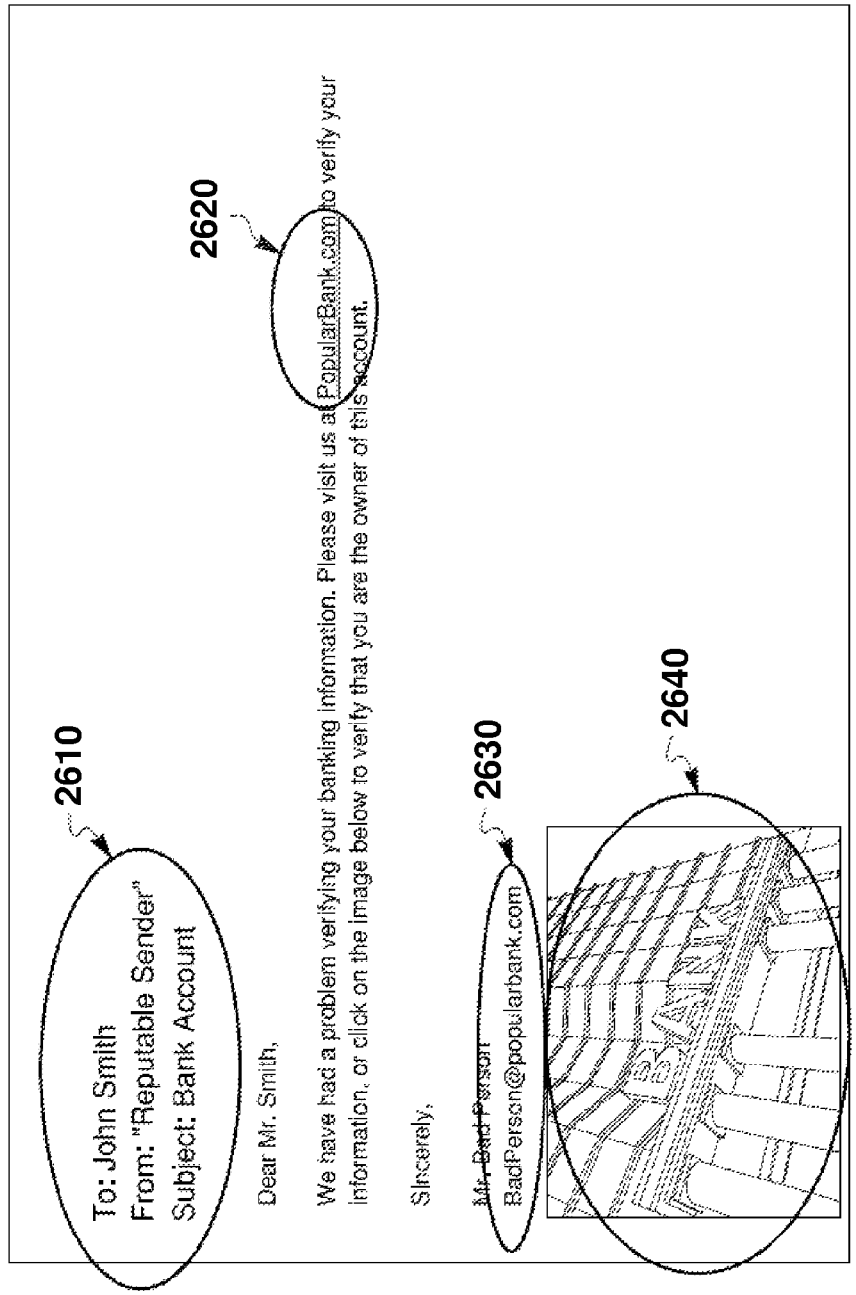
FIG. 26 illustrates a potentially malicious email in accordance with several embodiments.

FIG. 26 illustrates a potentially malicious email in accordance with several embodiments. In FIG. 26, there is illustrated a to/from/subject header 2610, a link to fraudulent webpage or web page content "popularbank.com" 2620, an email address to the actual or supposed sender 2630, and a logo 2640 which could also contain an embedded clickable link to fraudulent website content. The malicious email depicted in FIG. 26 could appear as if a user is going to the Web site popularbank.com by following link 2620 or clickable logo 2640 in order to enter in sensitive personal information, when in fact the user is actually going to the Web site badsite.com. Once clicked, the link 2620 to the malicious Web site content may route the user to a false Web page where the user can be asked to login or provide other valuable information. The user can enter the login information or other important data, which may then be harvested, emailed or otherwise captured by the malicious entity. The malicious entity, in turn, may use the information to facilitate various forms of online fraud and identity theft or give, trade or sell the information to others for similar misuse, etc.

Accordingly, various embodiments also encompass scanning emails for potentially malicious content. Because emails are capable of containing multiple forms of information, such as images, metadata, logos, links, video, attachments and various other forms of data, there are numerous data elements associated with the email that could be compromised.

For example, it is well known that the sender of an email can frequently be faked. Thus, in email header 2610 the sender could be a presumably reputable business, such as a popular bank (for example, info@popularbank.com), or even a supposed representative of the reputable business (such as John.Doe@reputablebank.com), as illustrated in email address 2630. This is often an extremely effective way to deceive an email recipient into believing that the email is legitimate. However, there are some methods to determine whether the sender's email address is legitimate. For example, the originating IP address, domain name server (DNS), URL, or indications of proximity (proxy) hiding may each be used to determine the potential validity of an email sender. Furthermore, the originating email IP address, DNS or URL could have been previously stored in records obtained from the internet by software or human web crawlers, or even from customers or analysis performed on emails by third party entities that could be used to compare a suspicious email to known reputable or non-reputable entities.

Emails also often contain metadata, which is a hidden form of data usually stored in the background code of the email, sometimes in the email's headers or footers. Metadata may only be visible to the browser, email program, or other various forms of software, and not be immediately apparent to the email recipient. Metadata may also be used to identify suspicious email sources that might originate from potentially malicious parties, or could contain various other forms of electronic signatures indicating that the nature of the email is suspicious. Such data could also be compared to instantaneous, referential, or previously stored data obtained in any or more of the fore stated methods. Accordingly, an email can be evaluated (or crawled) based on its metadata content.

The validity of an email might also be judged in part based on links in the email. Erroneous links can be particularly difficult problems, because email recipients often do not check the destination address that the links proclaim to represent. Worse, links can be stored in other media, such as in images (logos, image content, etc.), videos, audio files, downloadable content or attachments, etc. Thus, the recipient can be fooled in numerous ways into accessing a malicious web page or web page content, or compromising their own computer to provide information to a perpetrator.

For example, a malicious user attempting to perpetrate a phishing attack against an email recipient could simply type in a web address that reads anything, such as a supposedly reliable link "popularbank.com" 2620 as illustrated in FIG. 26. Of course, this address could potentially read anything, such as "WhiteHouse.gov", or "GrandCanyon.org". The perpetrator could then simply apply a hyperlink to the text prior to emailing it, directing a recipient to a different destination, such as "www.badguys.com."

Furthermore, the perpetrator could embed the link in a copied or stolen logo, image, or otherwise recognizable feature of the page, such as image 2640 illustrated in FIG. 26, or a video file such as a shockwave .swf file, mp4 file, mp3 audio file, etc. In this case, the recipient of a malicious email may not even see a link such as link 2620, but only image 2640 of the trusted establishment that is clickable. Alternatively, one or both may be visible, and both could be re-directed to "badguys.com" in the same fashion. In any of these cases, it is possible that the recipient may not perform a close examination of the URL that they are being directed to (such as "poplarbank.com"), or may even be being to a web page that is legitimate but has itself been hijacked.

By using a scoring engine such as the scoring engine described below, malicious web sites could be identified ahead of time and simply checked against the link provided in the nefarious email based on a prior determination based on content, DNS, IP address, or diction in the email. Alternatively, a malicious link could be evaluated in real-time using any of these methods or more by one or more web crawlers that can assess the link nearly instantaneously to determine if the link likely leads to a malicious web page. In some embodiments this could be carried out by a person after the email has been received, who performs a third-party service of personally checking the emails to determine if any of the email content is nefarious.

Another form of deception could be a request to contact the malicious sender directly, such as via a malicious email address 2630 as depicted in FIG. 26. It should be noted that the sender could also have conveyed a phone number, facsimile number, mailing address, or any other form of contact. In this situation, the recipient of a malicious email could be requested to contact the malicious party (or an associate, employee, etc. of the malicious party) to exchange information with them directly or indirectly.

Each of these scenarios can pose risks to the recipient of a potentially malicious email. However, the risk associated with each of these scenarios may also be mitigated by a system, method, and/or apparatus that examines the content of a potentially malicious email. For example, software algorithms can be created which examine (or crawl) an email's contents. In some embodiments, the email crawler(s) could be employed by a recipient, installed automatically in hardware or software, or could even be provided by a third-party that either monitors the emails remotely. Such a system, apparatus or method could filter incoming emails through a software application before passing the email(s) to a recipient.

The email crawler(s) may perform various functions that could identify a likelihood of the validity of an email based on the various text, links, images, videos, downloadable media, metadata, etc. associated with the email. For example, in some embodiments, an email crawler can search the email text for words or phrases that are generally recognized or predicted to be illegitimate, such as "Nigerian Prince", or "Russian Bride". These text strings could be determined to be potentially malicious instantaneously, could reside in a database of collected text strings known or suspected to be malicious, or could be determined to be potentially malicious by human or other means by a third-party, software, etc. Alternatively, an email may be passed on to a user, or flagged as safe if certain known "safe" text strings are present, such as "Grandma says Happy Birthday", and which contain no further links, images, downloadable media, etc.

In addition to searching the text of an email, such email crawler(s) could investigate any or all of the other email features previously discussed. For example, one or more email crawlers could compare, record, or otherwise investigate the email metadata information, such as the IP address of the sender (say, [10.9.6.115]), the time sent by the sender's email service (say, 29 May 2015 15:13:48-0600), and the Message-ID for that particular message as added by the email service. This information could also include further data, such as the number of hops the email took to reach the recipient, IP addresses of the hop servers, and/or where those hops occurred (for example, if the email originates from a nearby family member, friend or other entity, a large number of hops, or hops involving servers in foreign countries could appear to be suspicious). Emails could further be ranked on such data, and conditions such as an unusual amount of hops or foreign hops could be flagged as potentially malicious or rejected altogether.

Because emails can contain multiple forms of malicious content, one or more crawlers could independently follow various links in the email, such as link 2620, or (potentially) clickable image/logo link 2640. The one or more crawlers could then perform any number of actions, such as evaluating whether or not the destinations of the links are associated with malicious activity. For example, the links could be compared to a stored database. The one or more web crawlers could even perform further investigation, such as evaluating the IP address, DNS, URL, registered domain holder, or utilize any other piece of electronic information associated with the email to decide if the email is potentially malicious. The one or more web crawlers could also send the various pieces of information to a third party for further evaluation, which could be a piece of software, a company, or an individual.

Another function that could be executed by the one or more web crawlers is identifying the legitimacy of the stamped (signature) or return email address 2630. For example, the email address 2630 may appear on the screen appears as "Bob@popularbank.com," could actually be pointing to "Jerry@BadPerson.com". This is a form of data that can be easy evaluated by the one or more web crawlers, and could also be stored in a database for future comparison against suspected legitimate or illegitimate websites. Of course, this information could also be passed on to other software, companies, or individuals to make the determination as to whether the email link (for example) originates from a malicious IP, DNS or URL, or is owned, hosted by, or otherwise affiliated with a suspicious entity.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that any figures, screen shots, tables, examples, etc. which highlight the functionality and advantages of the present invention, are presented for example purposes only. The architecture of the present invention is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Furthermore, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for determining whether email content is potentially malicious, contains potentially malicious content, has originated from a potentially malicious entity, or contains links or other references to potentially malicious web content, comprising:
    evaluating text in the email content to determine if predetermined suspected malicious phrases are present in the text;
    evaluating at least one link in the email content using at least one of an IP address, URL, and a domain name to determine if said at least one link references potentially malicious web content, the evaluating being a two step process of performing an initial analysis based on existing identification information about the at least one link, which includes IP address, URL, and the domain name, before accepting a remaining portion of the email content, which includes message body data; and
    evaluating metadata in the email content to determine if the email content is potentially malicious;
    using and configuring a scoring engine for a scoring process by providing a page score for a digital document representing a likelihood that the digital document includes potentially malicious content, the scoring engine uses a Word Expression equation, which includes at least one variable to represent a number of occurrences of at least specific keywords, and patterns in the potentially malicious content in the digital document, the using and configuring the scoring engine includes comparing information extracted from the digital document and forwarding the digital document for analysis and review, and the scoring engine providing at least one of realtime and post-production evaluation of the digital document and provides an output value, including the page score.

2. The method of claim 1, further comprising:
    determining whether the evaluated metadata indicates that the email content originated from a suspicious entity, including at least one of a suspicious individual, organization, and a geographic region.

3. The method of claim 1, further comprising:
    evaluating at least one of an embedded link contained in a hyperlink, an image file, a video file, and an audio file.

4. The method of claim 1, further comprising:
    evaluating whether potentially malicious downloadable content attached to the email content is malicious.

5. The method of claim 1, further comprising:
    evaluating the email content remotely by a third party entity.

6. The method of claim 1, further comprising:
    evaluating the email content by a third party entity that monitors email content traffic directly filtered through a sub-system of the third party entity.

7. The method of claim 1, further comprising:
    evaluating the email content by an application running on the machine that one of receives and displays the email content.

8. A system for determining whether email content is potentially malicious, contains potentially malicious content, has originated from a potentially malicious entity, or contains links or other references to potentially malicious web content, comprising:
    a first module determining if the email content contains predetermined suspected malicious phrases, the first module includes a scoring engine, a security device, at least one mail server, and an intelligence database;

a second module determining if at least one link in the email content references potentially malicious web content using at least one of an IP address, URL, and domain name, the second module including a search engine, the security device, the email crawler, a web crawler, and the exclusion processor, the determining being a two step process of performing an initial analysis based on existing identification information about said at least one link, which includes IP address, URL, and the domain name, before accepting a remaining portion of the email content, which includes message body data; and a third module evaluating metadata in the email content to determine if the email content is potentially malicious, the third module includes a scoring engine, the security device, and the email crawler, the scoring engine performing a scoring process and providing a page score for a digital document to represent a likelihood that the digital document includes potentially malicious content, the scoring engine using a Word Expression equation, which includes at least one variable to represent a number of occurrences of at least specific keywords, and patterning in the potentially malicious content in the digital document, the scoring engine comparing information extracted from the digital document and forwards the digital document for review and analysis, and the scoring engine providing at least one of real-time and post-production evaluation of the digital document and provides an output value, including the page score.

9. The system of claim 8, wherein the third module also determines whether the evaluated metadata indicates that the email content originated from a suspicious entity, including at least one of a suspicious individual, organization, and a geographic region.

10. The system of claim 8, wherein the second module evaluates at least one of an embedded link contained in a hyperlink, an image file, a video file, and an audio file.

11. The system of claim 8, wherein a fourth module evaluates whether potentially malicious downloadable content attached to the email content is malicious.

12. The system of claim 8, wherein the email content is evaluated remotely by a third party entity.

13. The system of claim 8, wherein the email content is evaluated by a third party entity that monitors email content traffic directly as the email content is filtered through a sub-system of the third party entity.

14. The system of claim 8, wherein the email content is evaluated by an application running on the machine that one of receives and displays the email content.

15. An apparatus for determining whether email content is potentially malicious, contains potentially malicious content, has originated from a potentially malicious entity, or contains links or other references to potentially malicious web content, comprising:

a first module determining if the email content contains predetermined suspected malicious phrases, the first module including a scoring engine, a security device, at least one mail server and an intelligent database;

a second module determining if at least one link in the email content references potentially malicious web content using at least one of an IP address, URL, and a domain name, the second module including a search engine, the security device, the email crawler, a web crawler, and the exclusion processor, the determining being a two step process of performing an initial analysis based on existing identification information about said at least one link, which includes IP address, URL, and the domain name, before accepting a remaining portion of the email content, which includes message body data; and a third module evaluating metadata in the email content to determine if the email content is potentially malicious, the third module includes a scoring engine, the security device, and the email crawler, the scoring engine performing a scoring process and providing a page score for a digital document to represent a likelihood that the digital document includes potentially malicious content, the scoring engine using a Word Expression equation, which includes at least one variable to represent a number of occurrences of at least specific keywords, and patterning in the potentially malicious content in the digital document, the scoring engine comparing information extracted from the digital document and forwards the digital document for review and analysis, and the scoring engine providing at least one of real-time and post-production evaluation of the digital document and provides an output value, including the page score.

16. The apparatus of claim 15, wherein the third module also determines whether the evaluated metadata indicates that the email content originated from a suspicious entity, including at least one of a suspicious individual, organization, and a geographic region.

17. The apparatus of claim 15, wherein the second module evaluates at least one of an embedded link contained in a hyperlink, an image file, a video file, and an audio file.

18. The apparatus of claim 15, wherein a fourth module evaluates whether potentially malicious downloadable content attached to the email content is malicious.

19. The apparatus of claim 15, wherein the email content is evaluated remotely by a third party entity.

20. The apparatus of claim 15, wherein the email content is evaluated by a third party entity that monitors email content traffic directly as the email content is filtered through a sub-apparatus of the third party entity.

21. The apparatus of claim 15, wherein the email content is evaluated by an application running on the machine that one of receives and displays the email content.

* * * * *